(12) United States Patent
Zhang et al.

(10) Patent No.: US 12,326,305 B2
(45) Date of Patent: Jun. 10, 2025

(54) HEAT EXCHANGING ASSEMBLY

(71) Applicant: ZHEJIANG SANHUA AUTOMOTIVE COMPONENTS CO., LTD., Zhejiang (CN)

(72) Inventors: Rongrong Zhang, Zhejiang (CN); Yuan Yao, Zhejiang (CN); Yong Xu, Zhejiang (CN); Weixin Jiang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 443 days.

(21) Appl. No.: 17/790,033

(22) PCT Filed: Dec. 28, 2020

(86) PCT No.: PCT/CN2020/139992
§ 371 (c)(1),
(2) Date: Jun. 29, 2022

(87) PCT Pub. No.: WO2021/136150
PCT Pub. Date: Jul. 8, 2021

(65) Prior Publication Data
US 2022/0390193 A1    Dec. 8, 2022

(30) Foreign Application Priority Data

Jan. 3, 2020   (CN) .......................... 202010003517.1
Jan. 3, 2020   (CN) .......................... 202010003522.2

(51) Int. Cl.
*F28F 27/00*   (2006.01)
*F28D 9/00*    (2006.01)
*F28F 17/00*   (2006.01)

(52) U.S. Cl.
CPC .............. *F28F 27/00* (2013.01); *F28D 9/005* (2013.01); *F28F 17/005* (2013.01)

(58) Field of Classification Search
CPC ........ F28F 27/00; F28F 17/005; F28F 9/0246; F28F 27/02; F28D 9/005
(Continued)

(56) References Cited

U.S. PATENT DOCUMENTS

2013/0319634 A1* 12/2013 Sheppard ................ F28F 27/02
165/96
2014/0116649 A1*  5/2014 Cho ................... B60H 1/00342
165/96
(Continued)

FOREIGN PATENT DOCUMENTS

CN     201116848 Y    9/2008
CN     103791740 A    5/2014
(Continued)

OTHER PUBLICATIONS

European Search Report dated Dec. 20, 2023 for European Appl. No. 20911231.7.
(Continued)

*Primary Examiner* — Steve S Tanenbaum
(74) *Attorney, Agent, or Firm* — Ohlandt, Greeley and Perle, L.L.P.

(57) ABSTRACT

A heat exchanging assembly, comprising a heat exchanger core body. The heat exchanger core body comprises first-type plates and second-type plates; each first-type plate has a first orifice, a second orifice, and a third orifice; each second-type plate has a first orifice and a second orifice; along the length or width direction of the heat exchange core body, the third orifice is located between the first orifice and the second orifice; a first flow channel has a first partial fluid path, a second partial fluid path, a third partial fluid path, and (Continued)

an inter-plate path; the first partial fluid path is formed at the first orifice; the second partial fluid path is formed at the second orifice; and the inter-plate path is communicated with the first partial fluid path, the second partial fluid path, and the third partial fluid path.

20 Claims, 16 Drawing Sheets

(58) Field of Classification Search
USPC .................................................. 165/11.1
See application file for complete search history.

(56) References Cited

U.S. PATENT DOCUMENTS

| | | | | |
|---|---|---|---|---|
| 2015/0000869 A1* | 1/2015 | Denoual | ................... | F28F 3/08 |
| | | | | 165/96 |
| 2020/0149623 A1* | 5/2020 | Muhammad | ............. | F01P 11/08 |

FOREIGN PATENT DOCUMENTS

| | | |
|---|---|---|
| CN | 104303002 A | 1/2015 |
| CN | 207976028 U | 10/2018 |
| CN | 106918255 B | 12/2019 |
| CN | 209783359 U | 12/2019 |
| DE | 102012113081 A1 | 4/2014 |
| JP | 2015158315 A | 9/2015 |
| WO | 2009117885 A1 | 10/2009 |

OTHER PUBLICATIONS

International Search Report dated Mar. 25, 2021 for PCT Appl. No. PCT/CN2020/139992.

* cited by examiner

HEAT EXCHANGING ASSEMBLY

This disclosure is a national phase application of PCT international patent application PCT/CN2020/139992, filed on Dec. 28, 2020 which claims the benefit of priorities to the following two Chinese patent applications, both of which are incorporated herein by reference in their entireties, 1) Chinese Patent Application No. 202010003517.1, titled "HEAT EXCHANGING ASSEMBLY", filed with the China National Intellectual Property Administration on Jan. 3, 2020; and 2) Chinese Patent Application No. 202010003522.2, titled "HEAT EXCHANGING ASSEMBLY", filed with the China National Intellectual Property Administration on Jan. 3, 2020.

BACKGROUND

1. Field of the Disclosure

The present disclosure relates to the technical field of heat exchange, and in particular to a heat exchanging assembly.

2. Discussion of the Background Art

A battery thermal management system for a new energy vehicle includes a battery heat exchange system, which may include a heat exchange core body and an electronic expansion valve. The battery heat exchange system may include refrigerant and coolant, the coolant is used to cool the battery after heat exchange in the heat exchange core body, and the heat exchange core body may be in a plate heat exchange core body structure, the refrigerant passes through the electronic expansion valve and then enters the heat exchange core body, and exchanges heat with the coolant in the heat exchange core body. In order to improve the flow control accuracy of the working medium, the electronic expansion valve needs to collect information by a pressure sensor and a temperature sensor arranged in a system duct line, and a system controller calculates a superheat according to the corresponding control program and feeds it back to the electronic expansion valve, and the electronic expansion valve adjusts the flow accordingly.

SUMMARY

An object according to the present disclosure is to provide a heat exchanging assembly with a compact structure.

In order to achieve the above object, the following technical solution is used: a heat exchanging assembly includes a heat exchanger core body, the heat exchanger core body includes at least a first flow passage, the heat exchanger core body includes multiple stacked first-type plates and multiple stacked second-type plates;

each first-type plate includes a first orifice, a second orifice and a third orifice; each second-type plate includes a first orifice and a second orifice, the second-type plate does not include a third orifice, and the third orifice is located between the first orifice and the second orifice in a length or width direction of the heat exchanger core body;

the first flow passage includes a first part fluid path, a second part fluid path, a third part fluid path and an inter-plate path, the first part fluid path is formed at the first orifices of the first-type plates and the second-type plates, the second part fluid path is formed at the second orifices of the first-type plates and the second-type plates, the third part fluid path is formed at the third orifices of the first-type plates, and the first part fluid path, the second part fluid path and the third part fluid path are in communication through the inter-plate path.

The above technical solution according to the present disclosure includes the multiple first-type plates and the multiple second-type plates, each first-type plate includes the first orifice, the second orifice and the third orifice; the first part fluid path is formed at the first orifices of the first-type plates and the second-type plates, the second part fluid path is formed at the second orifices of the first-type plates and the second-type plates, and the third part fluid path is formed at the third orifices of the first-type plates, so that the heat exchanging assembly of the technical solution has three part fluid paths, which can be used for the mounting of a sensor and an expansion valve, and has a compact structure.

DETAILED DESCRIPTION OF THE EMBODIMENTS

Figure 1:
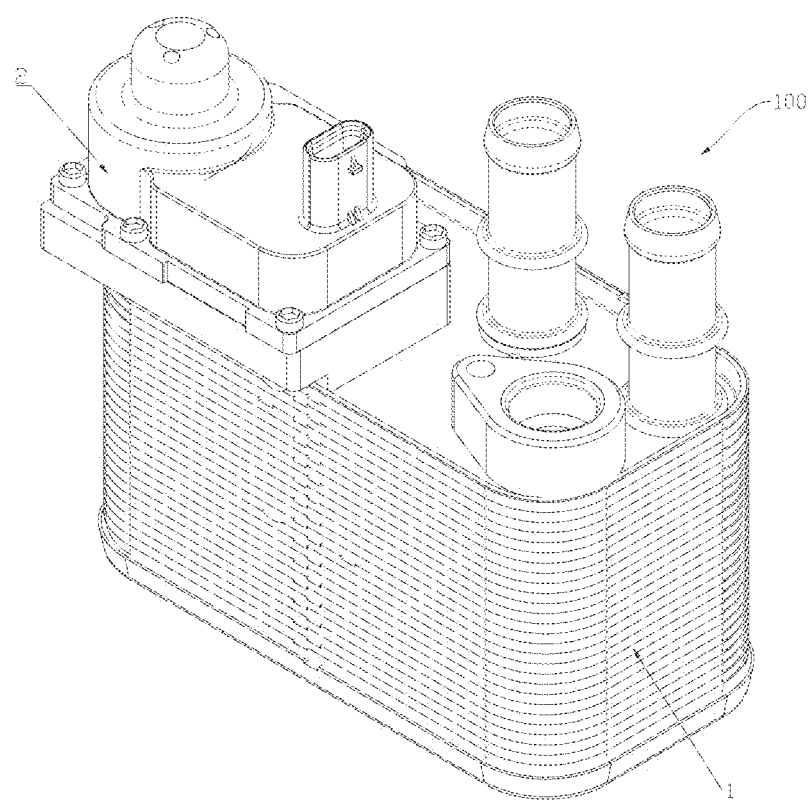
FIG. 1 is a schematic structural view of an embodiment of a heat exchanging assembly.
Figure 2:
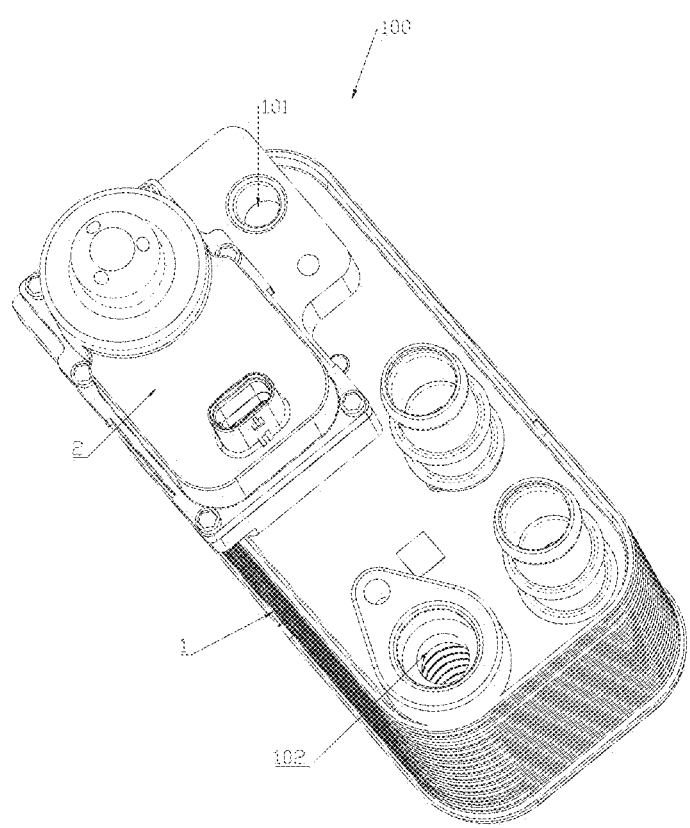
FIG. 2 is a schematic structural view of the heat exchanging assembly shown in FIG. 1 from another perspective.
Figure 3:
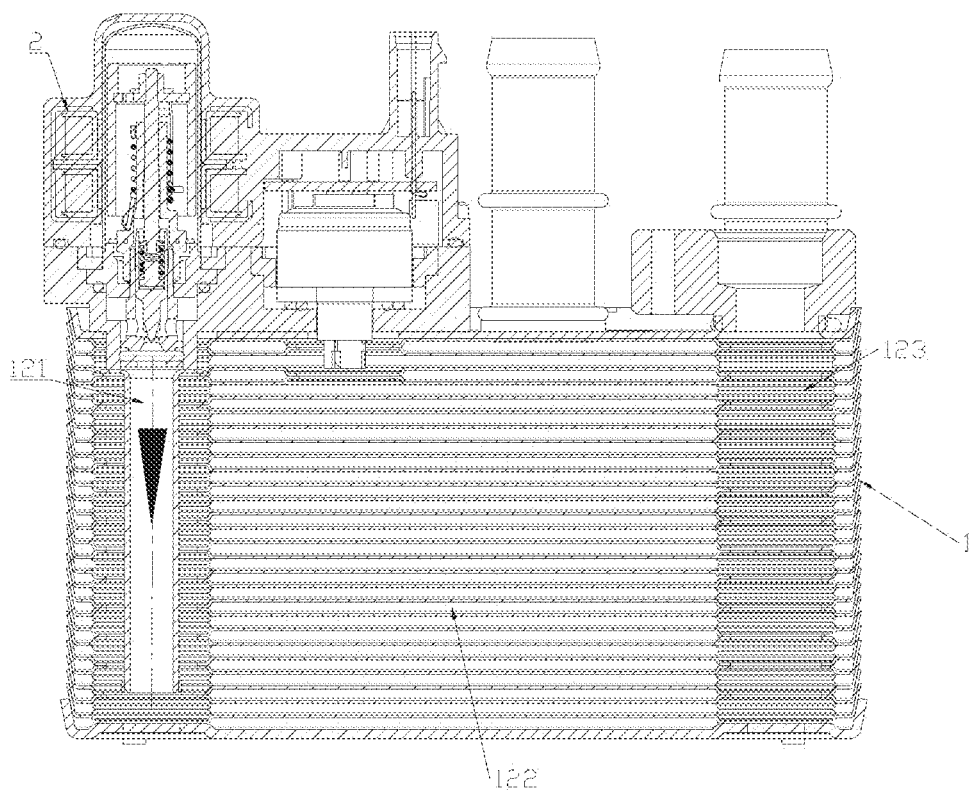
FIG. 3 is a schematic partial cross-sectional view of the heat exchanging assembly shown in FIG. 1.
Figure 4:
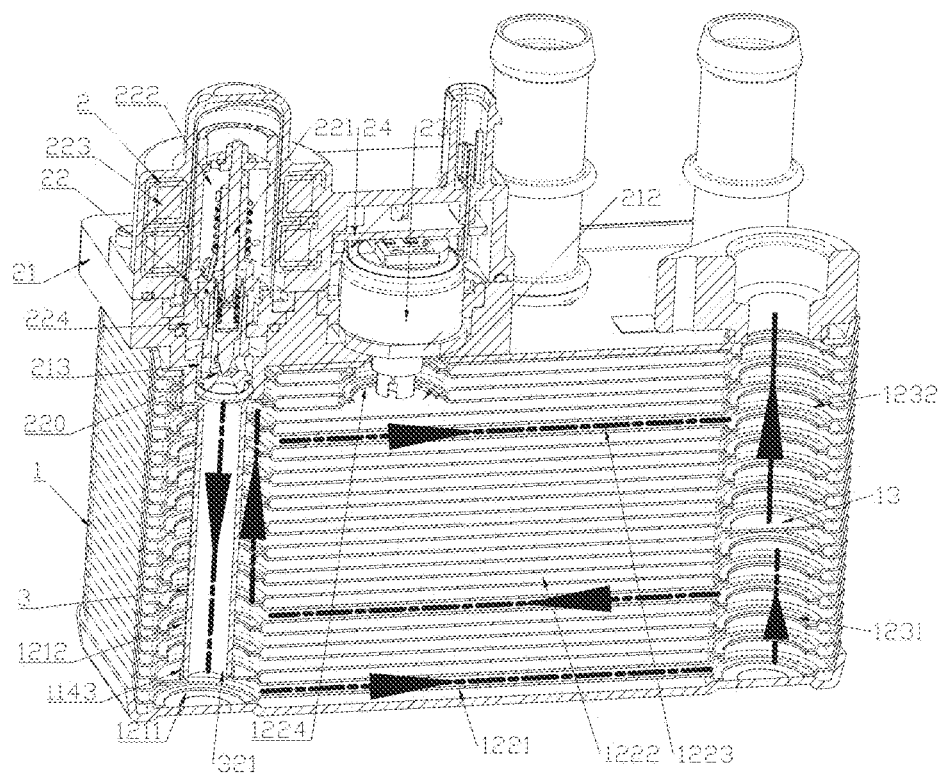
FIG. 4 is another schematic cross-sectional view of the heat exchanging assembly shown in FIG. 1.
Figure 5:
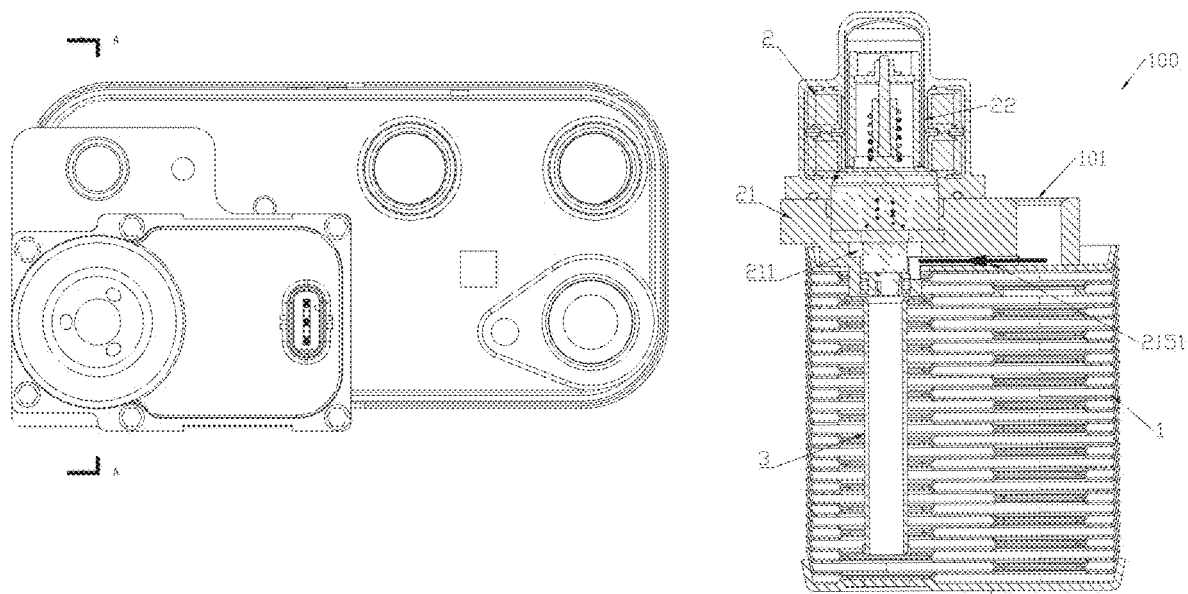
FIG. 5 is yet another schematic cross-sectional view of the heat exchanging assembly shown in FIG. 1.
Figure 6:
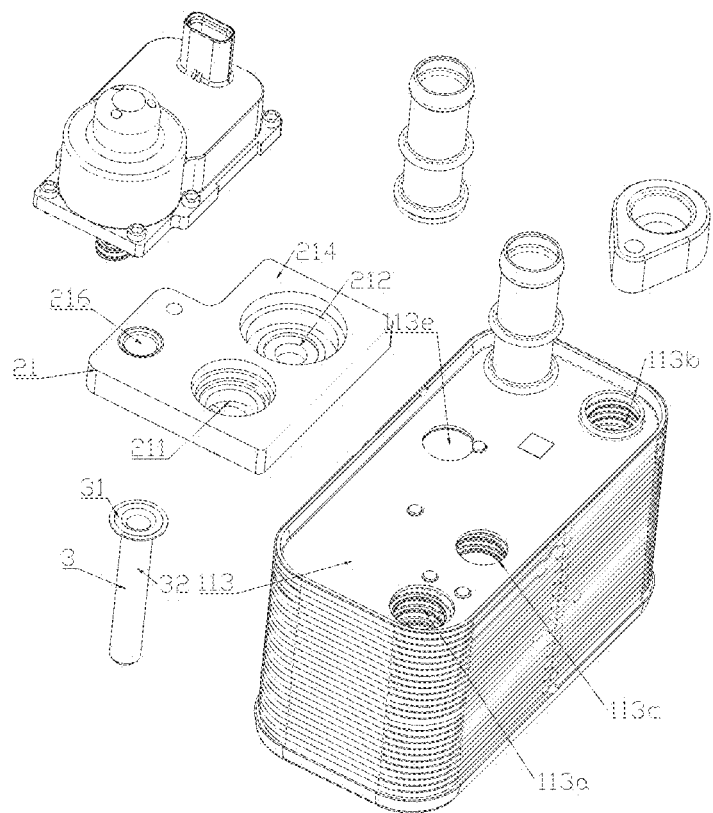
FIG. 6 is a schematic structural exploded view of the heat exchanging assembly shown in FIG. 1.

Referring to FIG. 1 and FIG. 2, which show a heat exchanging assembly 100, the heat exchanging assembly 100 includes a heat exchanger core body 1 and a valve assembly 2, and the heat exchanger core body 1 and the valve assembly 2 are fixedly arranged. The heat exchanger core body 1 includes multiple stacked plates 11, and the adjacent plates 11 are welded and fixed. Each plate 11 includes at least a first orifice and a second orifice, and the first orifices of the plates 11 are aligned in a stacking direction of the plates and the second orifices of the plates 11 are aligned in a stacking direction of the plates. The first orifices and the second orifices are adjacent to edges of the plates 11, so that the fluid flowing through the plates can have a relatively long flow path, which is beneficial to improving the heat exchange efficiency.

Referring to FIGS. 2 to 10, the heat exchanger core body 1 includes at least a first flow passage 12 and a second flow passage 13, and the fluids in the first flow passage 12 and the second flow passage 13 can exchange heat inside the heat exchanger core body 1. The heat exchanger core body 1 may further include a third flow passage or a fourth flow passage. The heat exchanger core body 1 includes multiple first-type plates and multiple second-type plates which are stacked, and the multiple first-type plates and the multiple second-type plates are stacked to form the first flow passage 12 and the second flow passage 13. Each first-type plate includes the first orifice, the second orifice and a third orifice; each second-type plate includes the first orifice and the second orifice but does not include the third orifice. In a length or width direction of the heat exchanger core body 1, the third orifice is located between the first orifice and the second orifice. In the length or width direction of the heat exchanger core body 1, the third orifice is located between the first orifice and the second orifice, which means that the first orifice and the second orifice may not be aligned, but the third orifice may be located in a zone between the first orifice and the second orifice, for example, in the length direction of the heat exchanger core body 1, or the third orifice may be located in a zone between the first orifice and the second orifice, for example, in the width direction of the heat exchanger core body 1.

The heat exchanger core body 1 includes a first part fluid path 121, an inter-plate path 122, a second part fluid path 123 and a third part fluid path 1224, the first part fluid path 121 is formed at the first orifices of the first-type plates and the second-type plates, the second part fluid path 123 is formed at the second orifices of the first-type plates and the second-type plates, the third part fluid path 1224 is formed at the third orifices of the first-type plates, and the inter-plate path 122 is in communication with the first part fluid path 121, the second part fluid path 123 and the third part fluid path 1224. Inter-plate paths with at least two fluids may be formed because of the stacking of adjacent plates 11, and the inter-plate path 122 here refers specifically to a fluid path between adjacent plates 11, and this fluid path is a part of the first flow passage and is in communication with the first part fluid path 121, the second part fluid path 123 and the third part fluid path 1224. Herein, the first part fluid path 121 includes (but is not limited to) one passage, and may include two or more passages, and the second part fluid path 123 includes (but is not limited to) one passage, and may include two or more passages.

The valve assembly 2 includes a valve body 21, a valve core member 22, a sensor 23 and a circuit board 24, the valve body 21 includes a first chamber 211 and a second chamber 212, at least part of the valve core member 22 is located in the first chamber 211, and at least part of the sensor 23 is located in the second chamber 212, and the sensor 23 senses a temperature and/or pressure of the first flow passage. In this embodiment, the second chamber 212 is in communication with the inter-plate path 122, and the sensor 23 can sense a temperature and/or pressure of the inter-plate path 122 and is electrically connected to the circuit board 24.

In the structure shown in the Figures, the sensor 23 protrudes into the heat exchanger core body 1. Alternatively, the sensor 23 may not protrude into the heat exchanger core body 1 and may be located above the heat exchanger core body 1, and the second chamber 212 where the sensor 23 is located is in communication with the inter-plate path 122, which is used for the sensor 23 to collect a pressure and/or temperature of the fluid flowing through the heat exchanger core body 1. The sensor 23 protrudes into the heat exchanger core body 1 so that it can further reduce a height at which the sensor 23 protrudes out of the heat exchanger core body 1, which is beneficial to reducing the size.

The heat exchanging assembly includes a protruding-in portion 213, the protruding-in portion 213 is located in the first part fluid path 121 or in the third part fluid path 1224, at least part of the valve core member 22 is located in the protruding-in portion 213, and the part of the valve core member 22 is sealed to an inner wall of the protruding-in portion 213.

In this embodiment, the protruding-in portion 213 is located in the first part fluid path 121, at least part of the valve core member 22 protrudes into an inner chamber of the protruding-in portion 213, and the valve core member is sealed to the inner wall of the protruding-in portion 213.

The valve core member 22 includes a valve core 221, a rotor assembly 222 and a stator assembly 223, the stator assembly 223 is sleeved mounted on an outer periphery of the rotor assembly 222, and the stator assembly 223 is electrically connected to the circuit board 16. The valve assembly 2 further includes a valve port 220, and the valve port 220 can communicate flow passages located on two sides of the valve port 220. In this embodiment, the valve body 21 further includes a valve seat 224, which is arranged on an outer periphery of the valve core 221 and is position limited, the valve port 220 is formed on the valve seat 224, and the valve core 221 changes a flow cross-sectional area of the working medium at the valve port 220 by approaching or moving away from the valve port 220, so as to form a throttling at the valve port 220. In the operation of the valve component 2, a current in a coil wound through the stator assembly 223 is controlled according to a predetermined mode, so as to control the stator assembly 223 to generate a varying excitation magnetic field. The rotor assembly 222 rotates under the action of the excitation magnetic field, and the rotor assembly 222 is capable of driving the valve core 221 to move relative to the valve port 220 and adjusting an opening degree of the valve port 220. In this way, the rotor assembly is capable of driving the valve core 221 to move relative to the valve port 220. The opening degree of the valve core 221 relative to the valve port 220 is controlled by the current through the stator assembly, which is beneficial to improve the accuracy of flow control.

The valve body 21 is welded and fixed to the heat exchanger core body 1. In an embodiment, the heat exchanger core body 1 includes a top plate 113, multiple intermediate plates 114, and a bottom plate 115, the multiple intermediate plates 114 are located between the top plate 113 and the bottom plate 115, the top plate 113, the multiple intermediate plates 114, and the bottom plate 115 are welded and fixed, the valve body 21 is welded and fixed to the top plate 113, or the valve body 21 is welded and fixed to the bottom plate 115. In another embodiment, the heat exchanger core body includes a connecting member, a top plate, multiple intermediate plates, and a bottom plate, the multiple intermediate plates are located between the top plate and the bottom plate, the top plate, the multiple intermediate plates, and the bottom plate are welded and fixed, the valve body is welded and fixed to the connecting member, and the connecting member is welded and fixed to the top plate or the connecting member is welded and fixed to the bottom plate. In yet another embodiment, the heat exchanger core body includes a connecting member, a top plate, multiple intermediate plates, and a bottom plate, the multiple intermediate plates are located between the top plate and the bottom plate, the top plate, the multiple intermediate plates, and the bottom plate are welded and fixed, the connecting member is welded and fixed to the bottom plate, and the valve body is welded and fixed to the top plate. In yet another embodiment, the heat exchanger core body includes a connecting member, a top plate, multiple intermediate plates, and a bottom plate, the multiple intermediate plates are located between the top plate and the bottom plate, the top plate, the multiple intermediate plates, and the bottom plate are welded and fixed, the connecting member is welded and fixed to the top plate, and the valve body is welded and fixed to the top plate. The connecting member may be in a form of connecting plate, or in a form of connecting block.

In the structure shown in the Figures, the protruding-in portion 213 is integrally formed with the valve body 21, the valve body 21 includes a first side portion 214 and a second side portion 215, the first side portion 214 is matched with the valve core member, the second side portion 215 is matched with the heat exchanger core body 1, and the second side portion 215 is welded and fixed to the heat exchanger core body 1. The protruding-in portion 213 is a part of the valve body 21, the second side portion 215 is provided with the protruding-in portion 213, which is protruding from the second side portion 215, the first chamber 211 extends through the protruding-in portion 213 and extends through the first side portion 214 and the second side portion 215, and the second chamber 212 extends through the first side portion 214 and the second side portion 215.

In this embodiment, the protruding-in portion 213 is a part of the valve body 21, and the first chamber 211 extends through the protruding-in portion 213, which means that when the valve body is not assembled, a space for the first chamber 211 is provided inside the protruding-in portion 213. The first chamber 211 extends through the first side portion 214 and the second side portion 215, which means that when the valve body is not assembled, the first chamber 211 has openings on both the first side portion 214 and the second side portion 215. The same meaning applies to the similar descriptions below.

The protruding-in portion 213 and the valve body 21 may be integrally formed after being manufactured, or may be assembled into an integral structure by separate welding or the like. A boundary between the protruding-in portion 213 and the second side portion 215 is distinguished by whether it is protruding and located inside the heat exchanger core body 1.

The valve body 21 includes a first through hole 216, the second side portion 215 includes a first groove 2151, and the first groove 2151 communicates the first through hole 216 with the first chamber 211. When the second side portion 215 is welded and fixed to the heat exchanger core body 1, the first groove 2151 is matched with the heat exchanger core body 1 to form a flow passage.

The protruding-in portion 213 includes an opening portion 2131 and a root portion 2132, the root portion 2132 includes a notch 2133, the notch 2133 is in communication with the first groove 2151, the valve core member includes a valve seat 224, a throttle inlet 2240 is provided on the valve seat 224, the throttle inlet 2240 is opened in a peripheral wall of the valve seat 224, and a flow area of the notch 2133 is larger than a flow area of the throttle inlet 2240.

An opening depth of the notch 2133 of the root portion 2132 in the stacking direction of the plates 11 is greater than an opening depth of the first groove 2151, and the notch 2133 is partially located inside the heat exchanger core body 1. Therefore, in a case that the valve core member is positioned into the protruding-in portion 213, when the throttle inlet 2240 is located inside the heat exchanger core body 1 and located below the top plate 113 (as can be seen from the Figures), the opening depth of the notch 2133 is greater than the opening depth of the first groove 2151, which allows the fluid flowing from the first groove 2151 to enter the throttle inlet 2240 through the deeper notch 2133, so that the valve core member can be protruded into the interior of the heat exchanger core body 1 more deeper, which is beneficial to reducing the height of the valve assembly protruding out of the heat exchanger core body 1 and reducing the size.

The heat exchanging assembly 100 includes a drainage duct 3, the drainage duct 3 is located in the first part fluid path 121, the valve core member includes a throttle outlet passage 2241, an inner chamber of the drainage duct 3 is in communication with the throttle outlet passage 2241, the first part fluid path 121 includes a first sub-path 1211 and a second sub-path 1212, the first sub-path 1211 is in communication with the inner chamber of the drainage duct 3, and the second sub-path 1212 is located outside the drainage duct 3.

The heat exchanger core body 1 includes a first blocking portion 13, the first blocking portion 13 is located in the second part fluid path 123, the second part fluid path 123 includes a third sub-path 1231 and a fourth sub-path 1232, the third sub-path 1231 and the fourth sub-path 1232 are located on two sides of the first blocking portion 13.

The heat exchanging assembly 1 includes a third blocking portion 14, the third blocking portion 14 is located in the first part fluid path 121, the first part fluid path 121 includes the first sub-path 1211 and the second sub-path 1212, the first sub-path 1211 is in communication with the inner chamber of the drainage duct 3, and the second sub-path 1212 is located outside the drainage duct 3. The third blocking portion 14 separates the first sub-path 1211 from the second sub-path 1212.

The inter-plate path 122 includes at least a first heat exchange zone 1221, a second heat exchange zone 1222 and a third heat exchange zone 1223, the first sub-path 1222 is in communication with the first heat exchange zone 1221, the first heat exchange zone 1221 is in communication with the third sub-path 1231, the third sub-path 1231 is in communication with the second heat exchange zone 1222, the second heat exchange zone 1222 is in communication with the second sub-path 1212, and the second sub-path 1212 is in communication with the third heat exchange zone 1223.

Figure 8:
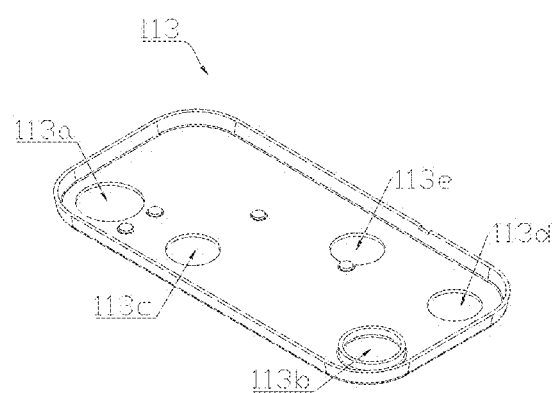
FIG. 8 is a schematic structural view of a top plate of the heat exchanging assembly shown in FIG. 1.

The top plate 113 of the heat exchanger core body 1 can be referred in FIG. 8, where the top plate 113 of the heat exchanger core body 1 includes a first orifice 113a, a second orifice 113b, a third orifice 113c, a fourth orifice 113d and a fifth orifice 113e. The first orifice 113a is configured to form the first part fluid path 121, and the second orifice 113b is configured to form the second part fluid path 123. The third orifice 113c is in communication with the second chamber 212, the fourth orifice 113d and the fifth orifice 113e are in communication with the second flow passage 13, the fluid in the first flow passage 12 exchanges heat with the fluid in the second flow passage 13 inside the heat exchanger core body 1.

Figure 9:
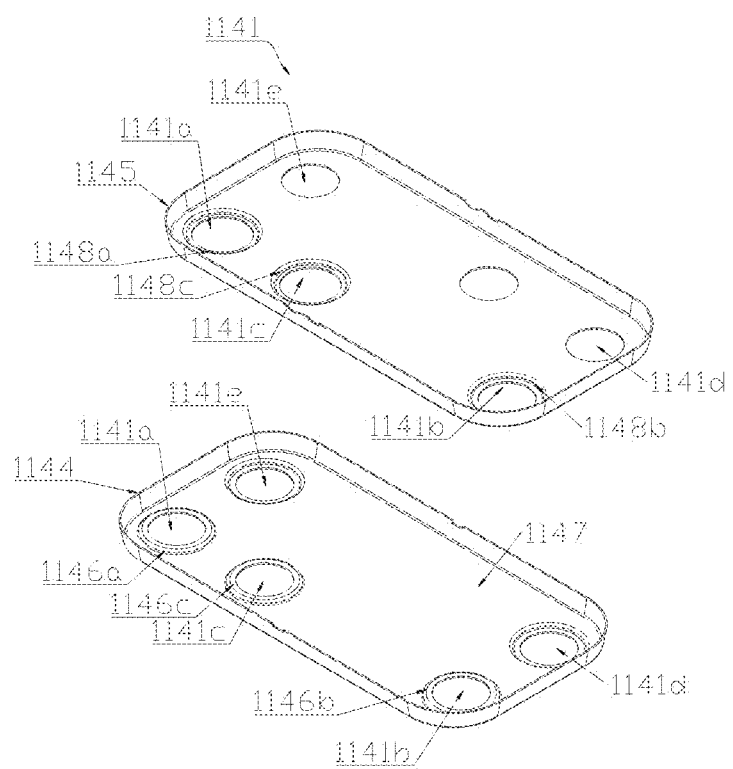
FIG. 9 is a schematic structural view of first-type plates of the heat exchanging assembly shown in FIG. 1.
Figure 10:
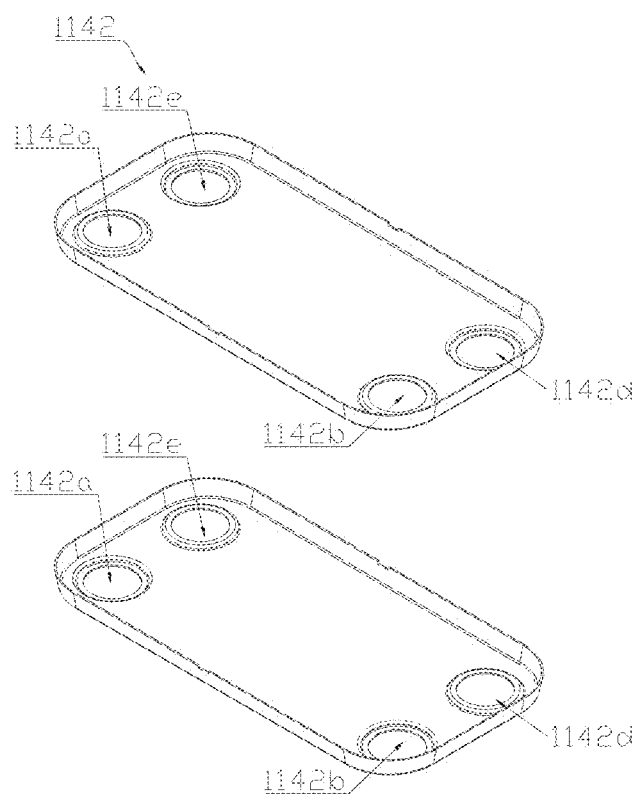
FIG. 10 is a schematic structural view of second-type plates of the heat exchanging assembly shown in FIG. 1.
Figure 11:
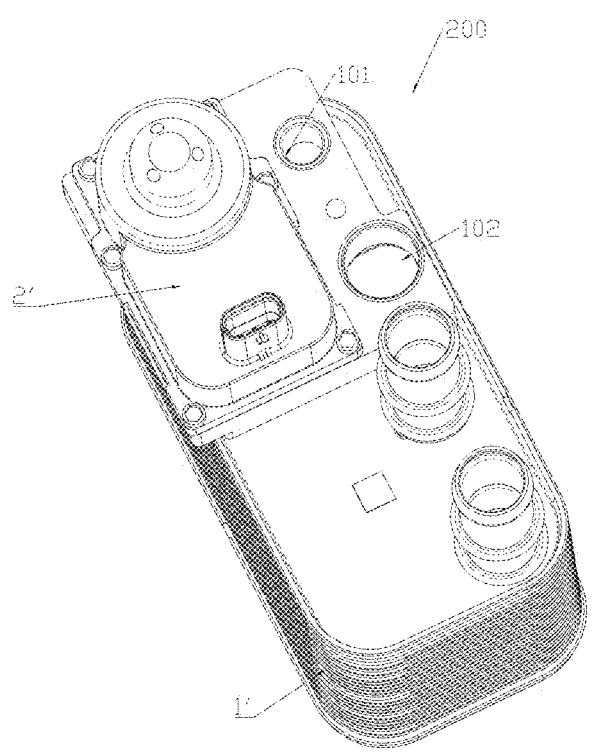
FIG. 11 is a schematic structural view of another heat exchanging assembly.
Figure 12:
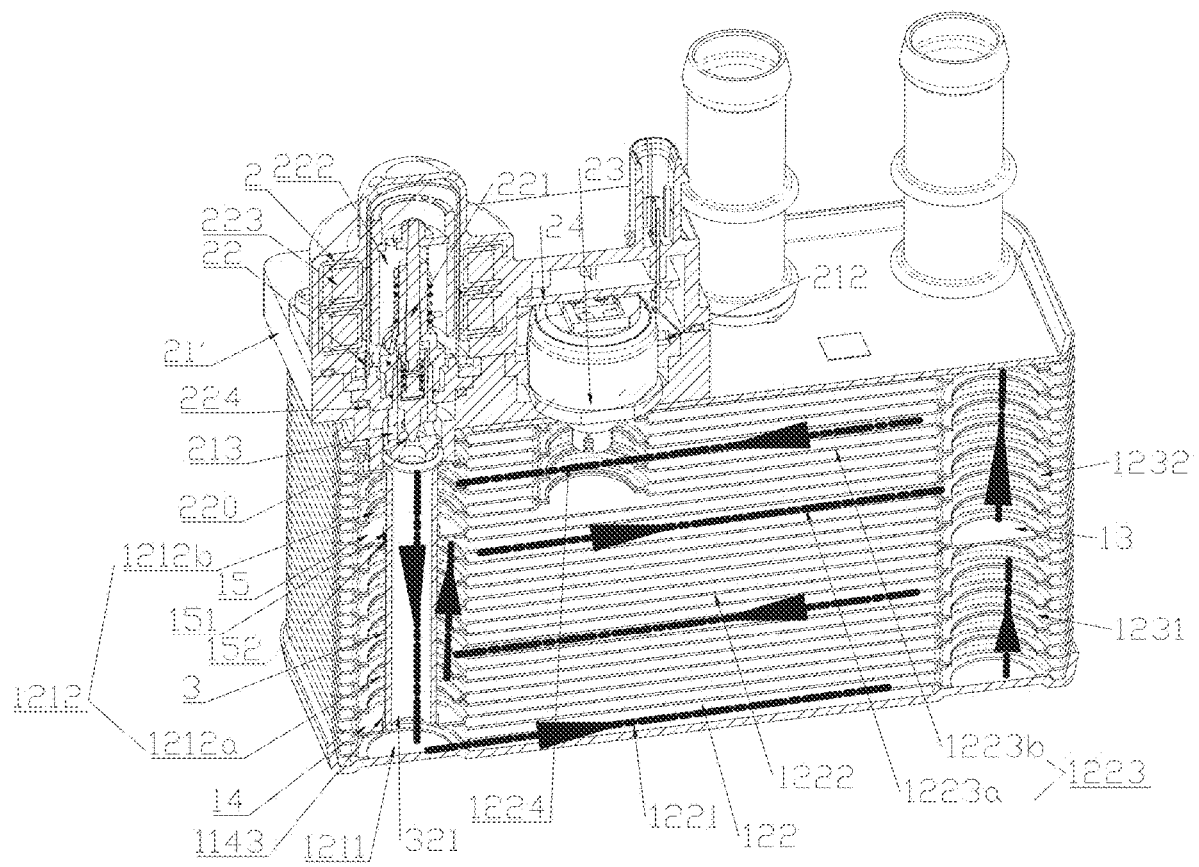
FIG. 12 is a schematic cross-sectional view of the heat exchanging assembly shown in FIG. 11.

The intermediate plates 114 of the heat exchanger core body 1 include first-type plates 1141 and second-type plates 1142, the first-type plates 1141 of the heat exchanger core body 1 can be referred in FIG. 9, and the second-type plates 1142 of the heat exchanger core body 1 can be referred in FIG. 10. As an example, each first-type plate 1141 of the heat exchanger core body 1 includes a first orifice 1141a, a second orifice 1141b, a third orifice 1141c, a fourth orifice 1141d and a fifth orifice 1141d, the first orifice 1141a, the second orifice 1141b, the fourth orifice 1141d and the fifth orifice 1141d are adjacent to edges of the first-type plate, respectively, and the third orifice 1141c is located near to a center of the first-type plate relative to the first orifice 1141a and the second orifice 1141b. In the length direction of the first-type plate, the third orifice 1141c is located between the first orifice 1141a and the second orifice 1141b. The third orifice 1141c is configured to form the third fluid flow path 1124, and the sensor 23 can be inserted into the third orifice 1141c.

The first-type plates 1141 have multiple first plates 1144 and multiple second plates 1145, and the multiple first plates 1144 and the multiple second plates 1145 are stacked to each other so as to form the inter-plate path 122. A periphery of the first orifice 1141a of each first plate 1144 has a first step portion 1146a, the first step portion 1146a protrudes relative to a plate plane 1147 of the first plate 1144, a periphery of the second orifice 1141b of each first plate 1144 has a second step portion 1146b, the second step portion 1146b protrudes relative to the plate plane 1147 of the first plate 1144, a periphery of the third orifice 1141c of each first plate 1144 has a third step portion 1146c, the third step portion 1146c protrudes relative to the plate plane 1147 of the first plate 1144, and the fluids flowing through the first orifice, the second orifice and the third orifice are the same fluid. The third step portion 1146c has the same height with the first step portion 1146a, and the third step portion 1146c has the same height with the second step portion 1146b. Therefore, after the plates are stacked, the third step portion, the second step portion and the first step portion can isolate the first orifice, the second orifice and the third orifice from the fluid paths of the plate plane of the plates, respectively. Since the sensor and/or the valve core member (the protruding-in portion) will be inserted into the third orifice, it requires for the sealing to the periphery of the third orifice. If there is leakage, the entire heat exchanging assembly will malfunction and fail. Therefore, the third step portion with the same height with the first orifice and the second orifice is arranged on the periphery of the third orifice, and the third step portion is welded and fixed to the adjacent plate structure, which can effectively solve the sealing problem. A periphery structure of the fourth orifice 1141d of the first plate 1144 is similar to a peripheral structure of the fifth orifice 1141e of the first plate 1144, and the fluids flowing through the fourth orifice 1141d and the fifth orifice 1141e are the same fluid.

A first recess ring 1148a is provided on the periphery of the first orifice 1141a of each second plate 1145 of the first-type plates 1141, a second recess ring 1148b is provided on the periphery of the second orifice 1141b, a third recess ring 1148c is provided on the periphery of the third orifice 1141c, and the recess ring structure of the multiple second plates 1145 is matched with the step portion structure of the multiple first plates 1144 so as to isolate the flow passages.

The second-type plates 1142 have multiple first plates, multiple second plates and multiple third plates, and each first plate of the second-type plates 1142 includes a first orifice 1142a, a second orifice 1142b, a fourth orifice 1142d and a fifth orifice 1142e, each second plate of the second-type plates 1142 includes a first orifice 1142a, a second orifice 1142b, a fourth orifice 1142d and a fifth orifice 1142e, each third plate of the second-type plates 1142 includes a first blocking portion and a first orifice, and the first blocking portions are located at positions corresponding to the second orifices of the first plates, the second plates and the fourth plates of the second-type plates. The first orifice 1142a, the second orifice 1142b, the fourth orifice 1142d and the fifth orifice 1142e are adjacent to edges of the plates, respectively, and the second-type plates are similar to the plate structure used in the plate heat exchanger, which will not be repeated here.

The first orifices 1141a of the first-type plates 1141 are aligned with the first orifices 1142a of the second-type plates 1142, to form a part of the first part fluid path, the third orifice 113c of the top plate 113 is not smaller than the first orifice 1141a of each first-type plate 1141, the first orifice 1141a of each first-type plate 1141 is not smaller than the first orifice 1142a of each second-type plate 1142, an outer diameter of the opening portion 2131 is less than an outer diameter of the first orifice 1141a of each first-type plate 1141, and the outer diameter of the opening portion 2131 is greater than an outer diameter of the first orifice 1142a of each second-type plate 1142. The second side portion of the valve body 21 is welded and fixed to a periphery portion of the top plate defined with the third orifice, so as to achieve sealing at the third orifice of the first-type plate.

The drainage duct 3 includes a protruding-out portion 31 and a main body portion 32, an outer diameter of the protruding-out portion 31 is greater than an outer diameter of the main body portion 32, the outer diameter of the main body portion 32 is no greater than the outer diameter of the first orifice 1142a of each second-type plate 1142, the main body portion 32 protrudes into the first orifice 1142a of each second-type plate 1142, and the outer diameter of the protruding-out portion 31 is greater than the outer diameter of the first orifice 1142a of each second-type plate 1142. The protruding-out portion 31 can be hung against the second-type plate 1142, and the protruding-out portion 31 is welded and fixed to the second-type plate 1142 to block the communication between the first orifice 1141a of the first-type plate 1141 and the first orifice 1142a of the second-type plate 1142. The protruding-out portion 31 of the drainage duct 3 may be welded and fixed to the opening portion 2131 of the protruding-in portion 213, which is beneficial for separating fluid paths on two sides of the protruding-out portion 31. The drainage duct 3 can be arranged so as to guide the fluid in the throttle outlet passage of the valve core member in communication with the drainage duct 3 to the first sub-path, so that the fluid enters the inter-plate path 122 together through the first sub-path 1211, which is beneficial for the fluid to exchange heat more uniformly in the inter-plate path and improving the heat exchange efficiency.

The main body portion 32 has a bottom end portion 321, the bottom end portion 321 is welded and fixed to at least one of the second-type plates 1142. In an embodiment, at least one of the second-type plates 1142 has an extending portion 1143, the extending portion 1143 is located at an outer periphery of the first orifice 1142a of the second-type plate 1142, and an outer wall of the bottom end portion 321 is welded and fixed to a wall portion of the extending portion 1143. The bottom end portion 321 is welded and fixed to the extending portion 1143, which is beneficial for isolating the inner chamber of the drainage duct 3 from an outer chamber of the drainage duct 3, and is beneficial for guiding the flow direction of the fluid. In another embodiment, the bottom end portion 321 of the drainage duct 3 has an extending portion, the extending portion extends beyond the outer periphery of the bottom end portion, and the extending portion of the drainage duct is welded and fixed to at least one of the second-type plates.

The first blocking portion 13 may be a part of one of the second-type plates 1142, or may be a separate structure. In an embodiment, one of the second-type plates includes a first blocking portion, the first blocking portion 13 is located at the second orifice of the second-type plate, and the first blocking portion 13 can separate the fluid paths on two sides. The first blocking portion 13 can be formed for example, by not punching the second orifice on this plate of the second-type plates 1142. In another embodiment, the first blocking portion 13 may be a separate plate structure, the plate structure closes the second orifice of one of the second-type plates 1142, and the first blocking portion 13 may be welded and fixed to the adjacent plate. In order to enhance strength, a thickness of the first blocking portion 13 may be greater than a thickness of the second-type plate 1142. In another embodiment, the first blocking portion 13 may have a first sheet portion and a second sheet portion, the first sheet portion is integrally arranged with one of the second-type plates and is formed by not punching a second orifice on the second-type plate 1142, the second sheet portion is welded and fixed to the first sheet portion, and the second sheet portion is located on a side facing the top plate of the first sheet portion. The second sheet portion can be configured to enhance the strength of the first sheet portion so as to be beneficial for resistance to the fluid impact in the third sub-path 1231.

The heat exchanger core body 1 includes the third part fluid path 1224, and the third part fluid path 1224 is in communication with the second chamber 212. The sensor 23 protrudes into the third part fluid path 1224. In the stacking direction of the plates, an extending depth of the third part fluid path 1224 in the heat exchanger core body 1 is greater than a depth of the protruding-in portion 213 protruding in the heat exchanger core body 1. In this way, the fluid entering the third heat exchange zone 1223 through the second sub-path 1222 can enter the third part fluid path 1224, and a temperature and/or pressure of the fluid is detected by the sensor 23 protruding in the third part fluid path 1224 and is fed back to the valve assembly 2, so as to control the flow regulation of the valve assembly 2.

The valve assembly 2 includes a circuit board 24, the circuit board 24 is electrically connected to the sensor 23, the valve assembly includes a valve needle, and the circuit board 24 controls some structures of the valve assembly to drive the valve needle to move.

The valve assembly 2 can be arranged coaxially with the first part fluid path 121, and the sensor 23 is arranged parallel to the valve assembly 2, which facilitates of precise controlling of the valve.

The refrigerant enters the drainage duct 3 by the throttling expansion of the valve core member 222 and is evaporating in the heat exchanger core body 1, and the refrigerant is in state of a gas-liquid two-phase. In order to improve the fluid heat exchange in the heat exchange zones, in the stacking direction of the plates, a height of the first heat exchange zone 1221 is less than a height of the second heat exchange zone 1222, and the height of the second heat exchange zone 1222 is less than a height of the third heat exchange zone 1223.

Figure 7:
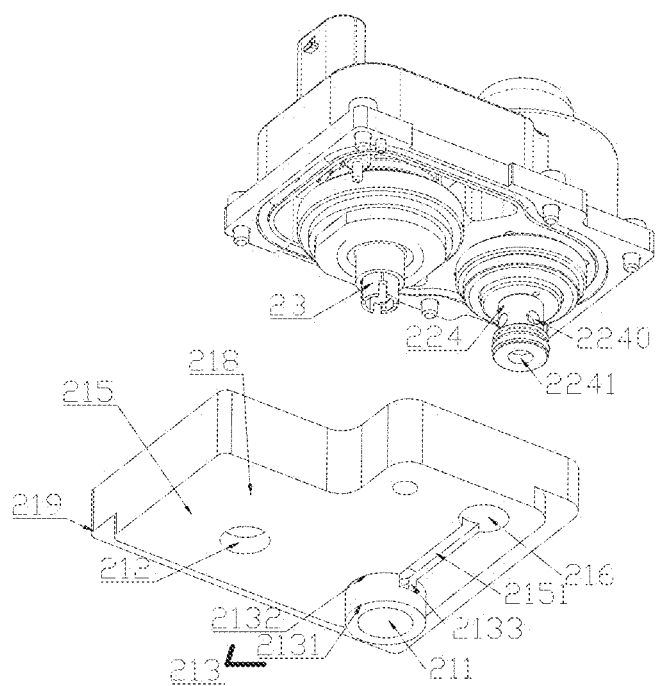
FIG. 7 is a schematic structural exploded view of a valve assembly.

As shown in FIG. 7, the valve body 21 includes a main portion 218 and an outer edge portion 219, the main portion 218 is located in the heat exchanger core body 1, a projection of the main portion 218 in the stacking direction of the plates is located on the plates, the outer edge portion 219 protrudes out of the heat exchange core body 1, and the outer edge portion 219 can be configured to position-limit and fix the valve core member. Since the outer edge portion 219 protrudes out of the heat exchange core body 1, the fixing to the valve core member, such as with a screw, is relatively simple, which prevents the interference effect of the heat exchange core body 1.

The heat exchanging assembly 100 includes a first port 101 and a second port 102, the first port 101 is located in the valve body 21, a port of the through hole 216 is the first port 101, and the second port 102 is located in the heat exchange core body 2. The flowing process in the heat exchanging assembly is as follows: the fluid enters through the first port 101, passes through the first groove 2151, passes through the throttle inlet passage 2240 of the valve core member, then passes through the throttle outlet passage 2241, and enters the inner chamber of the drainage duct 3, then enters the first sub-path 1211, the first heat exchange zone 1221, the third sub-path 1231, the second heat exchange zone 1222, the second sub-path 1212, the third heat exchange zone 1223, and the fourth sub-path 1232, and finally is flowing out through the second port 102.

In another embodiment, referring to FIGS. 11 to 14, the heat exchanging assembly 200 includes a heat exchange core body 1' and a valve assembly 2', and the heat exchange core body 1' and the valve assembly 2' are fixedly arranged. The valve assembly 2' includes a valve body 21', a valve core member 22, a sensor 23 and a circuit board 24, and the valve core member 22 includes a valve core 221, a rotor assembly 222 and a stator assembly 223. The structures of the valve core member and other structures are similar to that shown in FIG. 1, and are illustrated with the same reference numerals for concision.

The heat exchanging assembly includes a protruding-in portion, the protruding-in portion is located in the first part fluid path or in the third part fluid path, at least part of the valve core member protrudes into an inner chamber of the protruding-in portion, and the valve core member is sealed to an inner wall of the protruding-in portion.

In the structure shown in Figures, the protruding-in portion 213 is integrally formed with the valve body 21', the valve body 21' includes a first chamber 211 and a second chamber 212, at least part of the valve core member 22 is located in the first chamber 211, at least part of the sensor 23 is located in the second chamber 212, and the second chamber 212 is in communication with the inter-plate path 122. The sensor 23 protrudes into the heat exchange core body F. The sensor 23 is electrically connected to the circuit board 24. The protruding-in portion 213 protrudes into the first part fluid path 121, and at least part of the valve core member 22 protrudes into the protruding-in portion 213.

The valve body 21 includes a first side portion 214 and a second side portion 215, the first side portion 214 is matched with the valve core member, the second side portion 215 is matched with the heat exchanger core body 1', and the second side portion 215 is welded and fixed to the heat exchanger core body 1'.

The second side portion 215 is provided with the protruding-in portion 213, which is protruding from the second side portion 215. The first chamber 211 extends through the protruding-in portion 213, the first chamber 211 extends through the first side portion 214 and the second side portion 215, and the second chamber 212 extends through the first side portion 214 and the second side portion 215.

The valve body 21' includes a first through hole 216, the second side portion 215 includes a first groove 2151, and the first through hole 216 is in communication with the first chamber 211 through the first groove 2151. In case that the second side portion 215 is welded and fixed to the heat exchanger core body 1', the first groove 2151 is matched with the heat exchanger core body 1' so as to form a flow passage.

The valve body 21' includes a second through hole 217, the second side portion 215 includes a second groove 2152 and the second through hole 217 are in communication with the second chamber 212 through the second groove 2152. In case that the second side portion 215 is welded and fixed to the heat exchanger core body 1, the second groove 2152 is matched with the heat exchanger core body 1' so as to form a flow passage.

Figure 13:
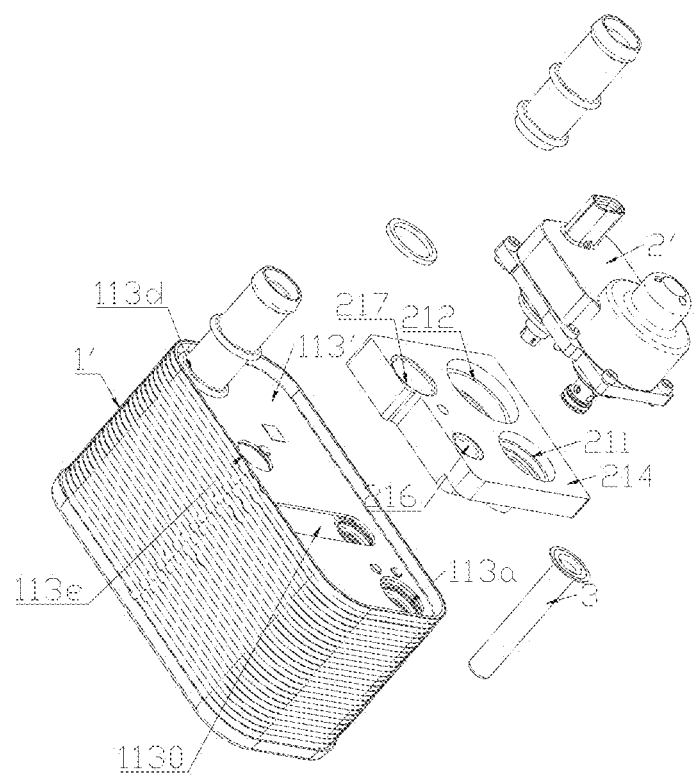
FIG. 13 is a schematic structural exploded view of the heat exchanging assembly shown in FIG. 11.
Figure 14:
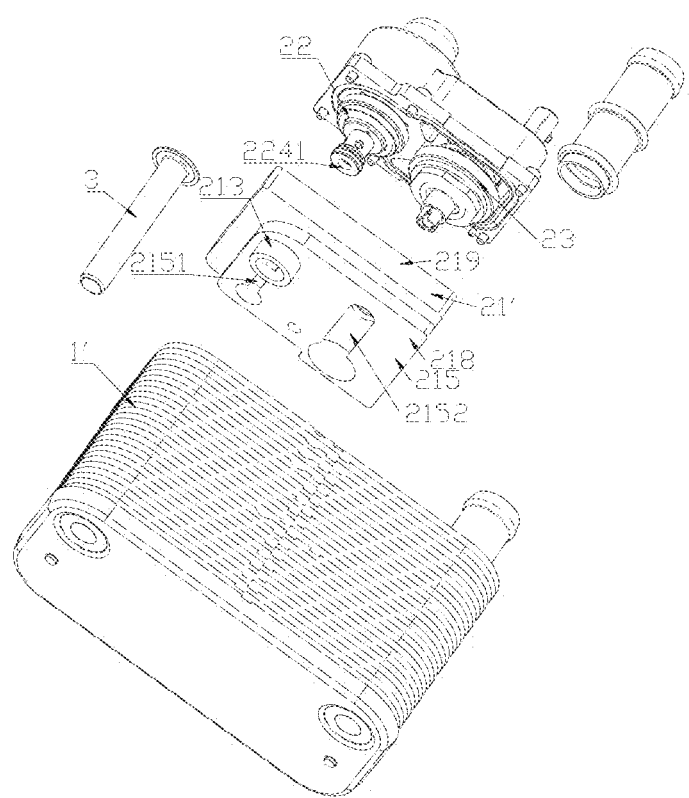
FIG. 14 is another schematic structural exploded view of the heat exchanging assembly shown in FIG. 11.

A top plate 113' of the heat exchange core body 1' can be referred to FIG. 13, the top plate 113' may be provided with a communication hole 1130, the communication hole 1130 extends along the top plate 113', one end of the communication hole 1130 is in communication with the second through hole 217, another end of the communication hole 1130 is in communication with the second chamber 212, and the communication hole 1130 is matched with the second groove 2152, which is beneficial for the fluid with a large flow to be flowing away through the second through hole 217 from the second chamber 212 via the communication hole 1130, and is beneficial for reducing the pressure drop and reducing the flow resistance.

The valve body 21' includes a main portion 218 and an outer edge portion 219, the main portion 218 is located in the heat exchanger core body 1', a projection of the main portion 218 in the stacking direction of the plates is located on the plates, the outer edge portion 219 protrudes out of the heat exchange core body, and the outer edge portion 219 can be configured to position limit and fix the valve core member. Since the outer edge portion 219 protrudes out of the heat exchange core body, the fixing to the valve core member, such as with a screw, is relatively simple, which prevents the interference effect of the heat t exchange core body.

The heat exchanging assembly 200 includes a drainage duct 3, the drainage duct 3 is located in the first part fluid path 121, the valve core member includes a throttle outlet passage 2241, an inner chamber of the drainage duct 3 is in communication with the throttle outlet passage 2241, the first part fluid path 121 includes a first sub-path 1211 and a second sub-path 1212, the first sub-path 1211 is in communication with the inner chamber of the drainage duct 3, and the second sub-path 1212 is located outside the drainage duct 3. The drainage duct 3 can be arranged so as to guide the fluid in the throttle outlet passage of the valve core member in communication with the drainage duct 3 to the first sub-path 1211, so that the fluid enters the inter-plate path 122 together through the first sub-path 1211, which is beneficial for the fluid to exchange heat more uniformly in the inter-plate path 122 and improving the heat exchange efficiency.

The heat exchanger core body 1' includes a first blocking portion 13, the first blocking portion 13 is located in the second part fluid path 123, the second part fluid path 123 includes a third sub-path 1231 and a fourth sub-path 1232, the third sub-path 1231 and the fourth sub-path 1232 are located on two sides of the first blocking portion 13.

The heat exchanger core body 1' includes a third blocking portion 14, the third blocking portion 14 is located in the first part fluid path 121, the first part fluid path 121 includes the first sub-path 1211 and the second sub-path 1212, the first sub-path 1211 is in communication with the inner chamber of the drainage duct 3, and the second sub-path 1212 is located outside the drainage duct 3. The third blocking portion 14 separates the first sub-path 1211 from the second sub-path 1212.

The heat exchanger core body 1' includes a second blocking portion 15, the second blocking portion 15 is located outside the drainage duct 3, the second sub-path 1212 includes a first branch path 1212a and a second branch path 1212b, and the first branch path 1212a and the second branch path 1212b are located on two sides of the second blocking portion 15.

The second-type plates 1142 of the heat exchanger core body include multiple first plates, multiple second plates, multiple third plates and multiple fourth plates, each first plate of the second-type plates 1142 includes a first orifice 1142a, a second orifice 1142b, a fourth orifice 1142d and a fifth orifice 1142e, each second plate of the second-type plates includes a first orifice 1142a, a second orifice 1142b, a fourth orifice 1142d and a fifth orifice 1142e, each third plate of the second-type plates includes a first blocking portion and a first orifice, the first blocking portions are located at positions corresponding to the second orifices of the first plates, the second plate and the fourth plate of the second-type plates. The second blocking portions are located at positions corresponding to the first orifices of the first plates, the second plates and the third plates of the second-type plates.

The inter-plate path 122 includes at least a first heat exchange zone 1221, a second heat exchange zone 1222 and a third heat exchange zone 1223, the first sub-path 1211 is in communication with the first heat exchange zone 1221, the first heat exchange zone 1221 is in communication with the third sub-path 1232, the third sub-path 1231 is in communication with the second heat exchange zone 1222, the second heat exchange zone 1222 is in communication with the first branch path 1212a of the second sub-path 1212, and the first branch path 1212a of the second sub-path 1212 is in communication with the third heat exchange zone 1223.

The third heat exchange zone 1223 includes a first partition zone 1223a and a second partition zone 1223b, the first partition zone 1223a is in communication with the first branch path 1212a, the first partition zone 1223a is in communication with the fourth sub-path 1232, the fourth sub-path 1232 is in communication with the second partition zone 1223b, and the second partition zone 1223b is in communication with the second branch path 1212b.

The drainage duct 3 includes a protruding-out portion 31 and a main body portion 32, an outer diameter of the protruding-out portion 31 is greater than an outer diameter of the main body portion 32, the outer diameter of the main body portion 32 is not greater than an outer diameter of the first orifices 1142a of the second-type plates 1142. The main body portion 32 protrudes into the first orifices 1142a of the second-type plates 1142, and the outer diameter of the protruding-out portion 31 is greater than the outer diameter the first orifices 1142a of the second-type plates 1142. The protruding-out portion 31 can be hung against the second-type plate 1142, and the protruding-out portion 31 is welded and fixed to the second-type plate 1142 to block the communication between the first orifice 1141a of the first-type plate 1141 and the first orifice 1142a of the second-type plate 1142. The protruding-out portion 31 of the drainage duct 3 may be welded and fixed to the opening portion 2131 of the protruding-in portion 213, which is beneficial for separating flow paths on two sides of the protruding-out portion 31.

The main body portion 32 includes a bottom end portion 321, the bottom end portion 321 is welded and fixed to at least one of the second-type plates 1142. In an embodiment, at least one of the second-type plates 1142 has an extending portion 1143, the extending portion 1143 is located at an outer periphery of the first orifice 1142a of the second-type plate 1142, and an outer wall of the bottom end portion 321 is welded and fixed to a wall portion of the extending portion 1143. The bottom end portion 321 is welded and fixed to the extending portion 1143, which is beneficial for isolating the inner chamber of the drainage duct 3 from an outer chamber of the drainage duct 3, and is beneficial for guiding the flow direction of the fluid. In another embodiment, the bottom end portion 321 of the drainage duct 3 has an extending portion, the extending portion extends beyond the outer periphery of the bottom end portion, and the bottom end portion of the drainage duct 3 is welded and fixed to at least one of the second-type plates.

The structure of the first blocking portion is the same with that of the above embodiments. The second blocking portion 15 is located at the first orifice of the plate, and the second blocking portion 15 has a middle hole 151, the drainage duct 3 extends through the middle hole 151, and an outer wall of the drainage duct 3 is welded and fixed to the second blocking portion 15, so as to separate the flow passages on two sides of the second blocking portion 15. The second blocking portion 15 may be a part of one of the first-type plates, or may be a separate structure. In an embodiment, one of the first-type plates includes a second blocking portion, and the second blocking portion can be formed, for example, by punching a small orifice on this plate of the first-type plates. The second blocking portion 15 includes an extending portion 152, the extending portion 152 of the second blocking portion is located at an outer periphery of the middle hole 151 of the second blocking portion, and the extending portion 152 of the second blocking portion 15 is welded and fixed to the outer wall of the drainage duct 3.

In another embodiment, the second blocking portion may be a separate plate structure, which closes the first orifice of one of the first-type plates, and the second blocking portion may be welded and fixed to the adjacent plate. In order to enhance strength, a thickness of the second blocking portion may be greater than a thickness of the first-type plate. In another embodiment, the second blocking portion may have a first sheet portion and a second sheet portion, the first sheet portion is integrally arranged with one of the first-type plates and is formed by punching a small orifice on the first-type plate, the second sheet portion is welded and fixed to the first sheet portion, and the second sheet portion is located on a side facing the top plate of the first sheet portion. The second sheet portion can be configured to enhance the strength of the first sheet portion to be beneficial for resistance to fluid impact in the second sub-path 1231. The first sheet portion and/or the second sheet portion may have an extending portion, the extending portion is located on the outer periphery of the middle hole of the second blocking portion, and the extending portion of the second blocking portion is welded and fixed to the outer wall of the drainage duct.

The third heat exchange zone 1223 includes a third part fluid path 1224, and the third part fluid path 1224 is in communication with the second chamber 212. The sensor 23 protrudes into the third part fluid path 1224. In the stacking direction of the plates, an extending depth of the third part fluid path 1224 in the heat exchanger core body 1' is greater than a depth of the protruding-in portion 213 protruding in the heat exchanger core body 1', and the extending depth of the third part fluid path 1224 in the heat exchanger core body 1' does not extend beyond the plate where the second blocking portion 15 is located. In this way, the fluid entering the second partition zone 1223b through the fourth sub-path 1232 can enter the third part fluid path 1224, and a temperature and/or pressure of the fluid is detected by the sensor 23 protruding in the third part fluid path 1224 and is fed back to the valve assembly, so as to control the flow regulation of the valve assembly.

The refrigerant enters the drainage duct 3 by the throttling expansion of the valve core member, and is evaporating in the heat exchanger core body 1', and the refrigerant may be in state of a gas-liquid two-phase. In order to improve the fluid heat exchange in the heat exchange zones, in the stacking direction of the plates, a height of the first heat exchange zone 1221 is less than a height of the second heat exchange zone 1222, and the height of the second heat exchange zone 1222 is less than a height of the third heat exchange zone 1223. In the stacking direction of the plates, the height of the first heat exchange zone 1221 is less than the height of the second heat exchange zone 1222, the height of the second heat exchange zone 1222 is less than a height of the first partition zone 1223a, and the height of the first partition zone 1223a is less than a height of the second partition zone 1223b.

The heat exchanging assembly 200 includes a first port 101 and a second port 102, the first port 101 and the second port 102 are located on the valve body 21', a port of the first through hole 216 is the first port 101, and a port of the second through hole is the second port 102. The flowing process in the heat exchanging assembly is as follows: the fluid enters through the first port 101, passes through the first groove 2151, passes through the throttle inlet passage of the valve core member, then passes through the throttle outlet passage 2241, and enters the inner chamber of the drainage duct, then enters the first sub-path 1211, the first heat exchange zone 1221, the third sub-path 1231, the second heat exchange zone 1222, the second sub-path 1212, the first partition zone 1223a, the fourth sub-path 1232, the second partition zone 1223b, and be gathered into the second chamber 212, and then flows to the second through hole 217 through the second groove 2151, and finally flows away through the second port 102 of the second through hole 217.

Figure 15:
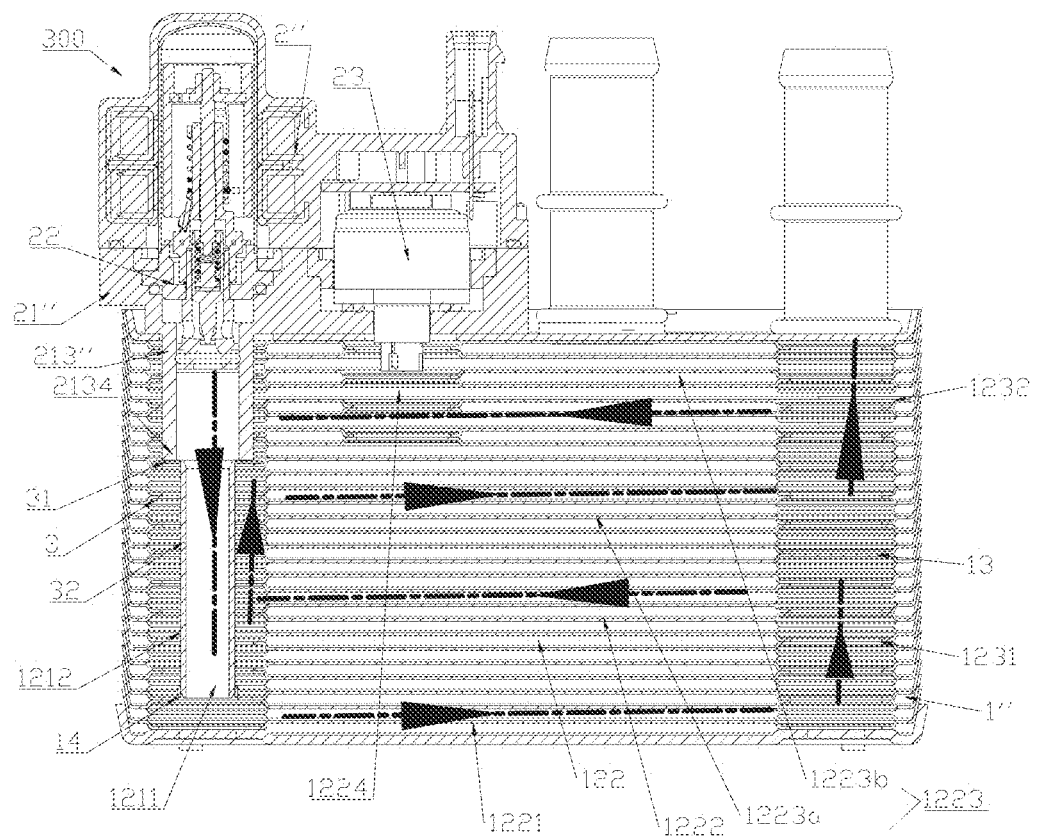
FIG. 15 is a schematic cross-sectional view of another heat exchanging assembly.

Referring to FIG. 15, FIG. 15 is a schematic cross-sectional view of a heat exchanging assembly 300. The heat exchanging assembly 300 includes a heat exchange core body 1" and a valve assembly 2", and the heat exchange core body 1" and the valve assembly 2" are fixedly arranged. The valve assembly 2" includes a valve body 21", a valve core member 22, a sensor 23 and a circuit board 24, and the valve core member 22 includes a valve core 221, a rotor assembly 222 and a stator assembly 223. The structures of the valve core member and other structures are similar to that shown in FIG. 1, and are illustrated with the same reference numerals for concision.

The valve body 21" includes a protruding-in portion 213", the protruding-in portion 213" has an end portion 2134, and the end portion 2134 is welded and fixed to the protruding-in portion 31 of the drainage duct 3. In the stacking direction of the plates, a height of the protruding-in portion 213" protruding into the heat exchanger core body 1" is greater than the height of the third part fluid path extending inside the heat exchanger core body 1"; that is, a depth of the end portion 2134 extending into the heat exchanger core body 1" is greater than a depth of the third part fluid path 1224.

The second sub-path includes a first branch path and a second branch path, and the first branch path and the second branch path are located on two sides of the end portion; the first branch path is in communication with the second heat exchange zone; the third heat exchange zone includes a first partition zone and a second partition zone, the first partition zone is in communication with the first branch path, the first partition zone is in communication with the fourth sub-path, the fourth sub-path is in communication with the second partition zone, and the second partition zone is in communication with the second branch path.

In this way, the protruding-in portion 31 can separate fluid paths, and the first part fluid path includes the inner chamber of the drainage duct, the first sub-path and the second sub-path located outside the drainage duct, so that, when entering the inner chamber of the drainage duct 3 through the throttle outlet passage, the fluid enters the first sub-path 1211, the first heat exchange zone 1221, the third sub-path 1231, the second heat exchange zone 1222, the second sub-path 1212, the first partition zone 1223a, the fourth sub-path 1232 and the second partition zone 1223b, and finally flows away through the second port.

The plate structure illustrated in the above drawings is only as an example, and in other embodiments, the plate structure of the heat exchanger core body may be in other plate structures.

Figure 16:
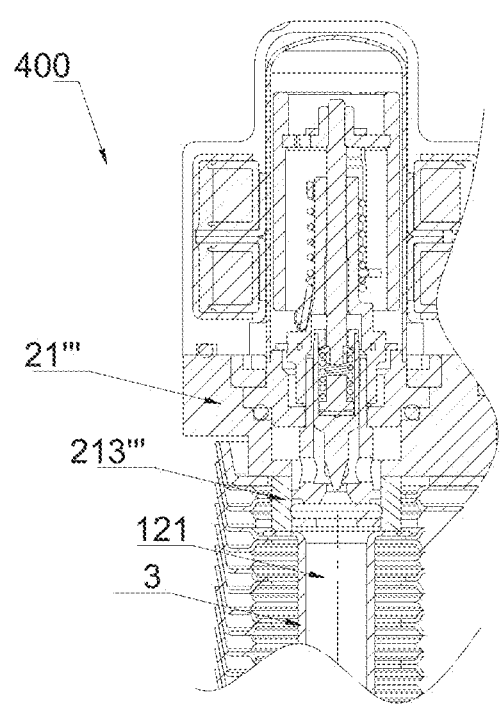
FIG. 16 is a schematic partial cross-sectional view of another heat exchanging assembly.

In another embodiment, FIG. 16 shows a partial structure of a heat exchanging assembly 400, the heat exchanging assembly 400 includes a protruding-in portion 213''', the protruding-in portion 213''' is a separate member when the heat exchanging assembly 400 is not assembled, and the protruding-in portion 213' is located in the first part fluid path 121, at least part of the valve core member is located in the protruding-in portion 213''', the protruding-in portion 213''' is welded and fixed to the drainage duct 3, and the protruding-in portion 213''' is welded and fixed to the valve body 21'''.

Figure 17:
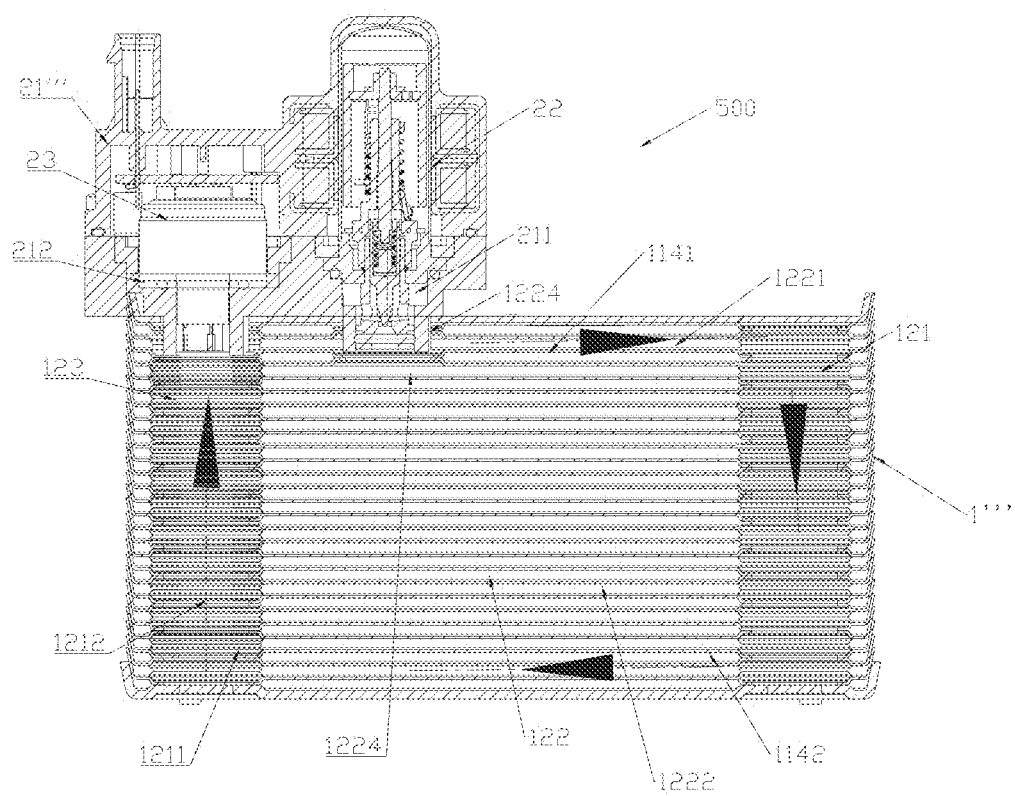
FIG. 17 is a schematic cross-sectional view of another heat exchanging assembly.

Referring to FIG. 17, FIG. 17 shows a schematic cross-sectional view of a heat exchanging assembly 500. The heat exchanging assembly 500 includes a heat exchange core body 1' and a valve assembly 2''', and the heat exchange core body 1' and the valve assembly 2' are fixedly arranged. The heat exchange core body 1' includes multiple stacked plates 11, any adjacent plates 11 are welded and fixed, and each plate 11 includes at least a first orifice and a second orifice. The first orifices of the plates 11 are aligned in a stacking direction of the plates, and the second orifices of the plates 11 are aligned in a stacking direction of the plates. The first orifices and the second orifices are adjacent to edges of the plates 11, so that the fluid flowing through the plates can have a relatively long flow path, which is beneficial for improving the heat exchange efficiency.

The valve assembly 2''' includes a valve body 21, a valve core member 22, a sensor 23 and a circuit board 24, the valve body 21 includes a first chamber 211 and a second chamber 212, at least part of the valve core member 22 is located in the first chamber 211, and at least part of the sensor 23 is located in the second chamber 212, and the first chamber 211 is in communication with the inter-plate path 122. The sensor protrudes into the heat exchanger core body 1, and the second chamber 212 is in communication with the second part fluid path 123. The sensor 23 is electrically connected to the circuit board 24.

The heat exchanger core body 1''' includes a first flow passage and a second flow passage, and the first flow passage is not in communication with the second flow passage. The heat exchanger core body 1''' includes multiple first-type plates and multiple second-type plates which are stacked arranged, and the multiple first-type plates and the multiple second-type plates are stacked to form the first flow passage and the second flow passage;

the first-type plates 1141 include multiple first plates and multiple second plates, and each first-type plate 1141 includes a first orifice, a second orifice and a third orifice.

The second-type plates 1142 include multiple first plates and multiple second plates, each first plate of the second-type plates 1142 includes a first orifice and a second orifice, and each second plate of the second-type plates includes a first orifice and a second orifice. In a length or width direction of the heat exchanger core body, the third orifice is located between the first orifice and the second orifice;

the first flow passage includes a first partial flow path 121, a second part fluid path 123, a third part fluid path, and an inter-plate path 122, the first part fluid path 121 is formed at the first orifices of the multiple first-type plates and the multiple second-type plates, the second part fluid path 123 is formed at the second orifices of the multiple first-type plates and the multiple second-type plates, the third orifices of the first plates of the first-type plates are aligned with the third orifices of the second plates of the first-type plates to form the third part fluid path, and the first part fluid path, the second part fluid path and the third part fluid path are in communication through the inter-plate path.

At least part of the valve core member 22 protrudes in the third part fluid path 1224, and at least part of the sensor 23 protrudes in the second part fluid path 123. The valve core member 22 is integrally provided with a protruding-in portion 213, the protruding-in portion 213 protrudes in the third part fluid path 1224, at least part of the valve core member 22 protrudes in the protruding-in portion 213, and the valve core member 22 is sealed to an inner wall of the protruding-in portion 213.

The inter-plate path 122 includes at least a first heat exchange zone 1221 and a second heat exchange zone 1222, the first heat exchange zone 1221 is in communication with the first part fluid path 121, and the second heat exchange zone 1222 is in communication with the second part fluid path 123. The heat exchanging assembly includes a first port and a second port, the first port can be configured as an inlet of the fluid, and the second port can be configured as an outlet of the fluid. After entering through the first port, the fluid passes through the throttle inlet passage, the throttle port and the throttle outlet passage of the valve core member, and enters the third part fluid path 1224, the first heat exchange zone 1221, the first part fluid path 121, the second heat exchange zone 1222, the second part fluid path 123 and the second chamber 212, and flows away through the second port. When the heat exchanging assembly is configured as an evaporator, the fluid evaporates and absorbs heat inside the heat exchanger after the throttling and depression of the valve core member, and a temperature and/or pressure of the fluid is obtained by the sensor 23 when the fluid passes through the second chamber 212, and the temperature and/or pressure is fed back to the circuit board of the valve core member, so as to timely adjust the valve core member. In this way, the valve core member can be adjusted accurately and quickly, which facilitates of adjusting the superheat of the fluid at the outlet of the heat exchanging assembly, and is more beneficial for the stability of the performance of the system connected to the heat exchanging assembly.

Figure 18:
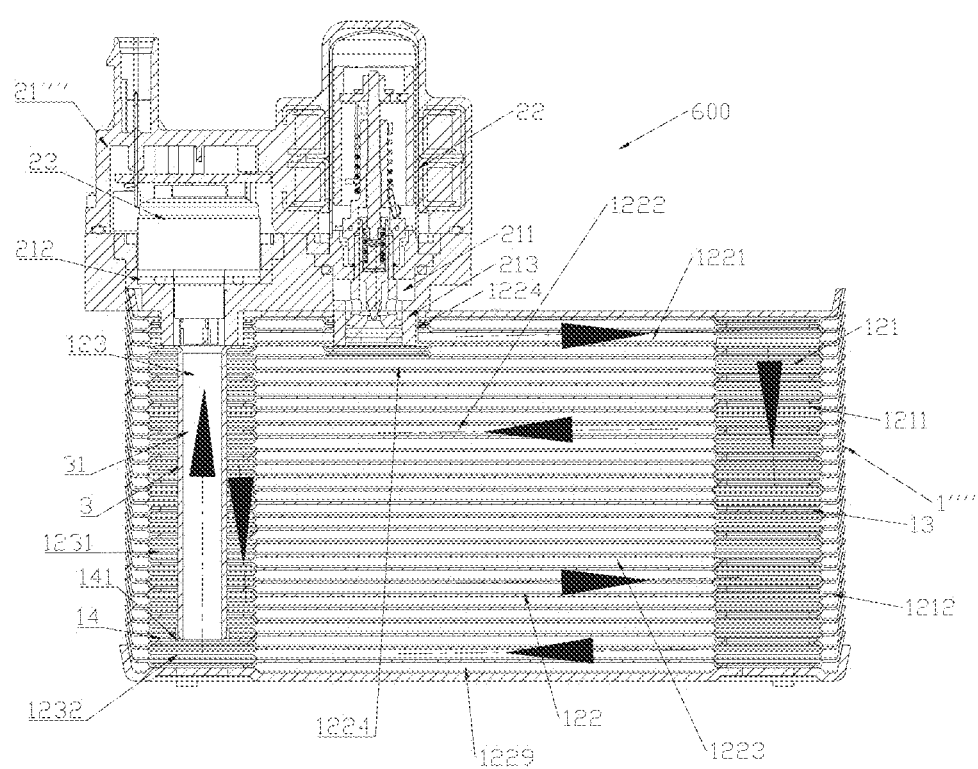
FIG. 18 is a schematic cross-sectional view of another heat exchanging assembly.

Referring to FIG. 18, FIG. 18 shows a schematic cross-sectional view of a heat exchanging assembly 600. The heat exchanging assembly 600 includes a heat exchange core body 1'''' and a valve assembly 2'''', and the heat exchange core body 1'''' and the valve assembly 2'''' are fixedly arranged. The heat exchange core body 1'''' includes multiple stacked plates 11, the adjacent plates 11 are welded and fixed, each plate 11 includes at least a first orifice and a second orifice. The first orifices of the plates 11 are aligned in a stacking direction of the plates and the second orifices of the plates 11 are aligned in the stacking direction of the plates. The first orifices and the second orifices are adjacent to edges of the plates 11, so that the fluid flowing through the plates can have a relatively long flow path, which is beneficial for improving the heat exchange efficiency.

The valve assembly 2'''' includes a valve body 21, a valve core member 22, a sensor 23 and a circuit board 24, the valve body 21 includes a first chamber 211 and a second chamber 212, at least part of the valve core member 22 is located in the first chamber 211, and at least part of the sensor 23 is located in the second chamber 212, and the first chamber 211 is in communication with the inter-plate path 122. The sensor 23 protrudes into the heat exchanger core body 1'''', and the second chamber 212 is in communication with the second part fluid path. The sensor 23 is electrically connected to the circuit board 24.

The heat exchanger core body 1'''' includes a first flow passage and a second flow passage, and the first flow passage is not in communication with the second flow passage. The heat exchanger core body 1'''' includes multiple first-type plates and multiple second-type plates which are stacked, and the multiple first-type plates and the multiple second-type plates are stacked to form the first flow passage and the second flow passage;

the first-type plates 1141 include multiple first plates and multiple second plates, each first-type plate 1141 includes a first orifice 1141a, a second orifice 1141b and a third orifice 1141c;

the second-type plates 1142 include multiple first plates and multiple second plates, each first plate of the second-type plates 1142 includes a first orifice 1141a and a second orifice 1141b, and each second plate of the second-type plates 1142 includes a first orifice and a second orifice. In a length or width direction of the heat exchanger core body, the third orifice 1141c is located between the first orifice 1141a and the second orifice 1141b;

the second-type plates 1142 include multiple third plates and multiple fourth plates. Each third plate of the of the second-type plates 1142 includes a first blocking portion 13 and a second orifice, and each fourth plate of the second-type plates 1142 includes a third blocking portion 14 and a first orifice. The first blocking portions 13 are located at positions corresponding to the first orifices of the first plates, the second plates and the fourth plates, and the third blocking portions 14 are located at positions corresponding to the second orifices of the first plates, the second plates and the third plates. The first part fluid path 121 includes a first sub-path 1211 and a second sub-path 1212, and the first sub-path 1211 and the second sub-path 121 are located on two sides of the first blocking portion 13. A depth of the third part fluid path 1224 protruding into the heat exchanger is less than a depth of the first blocking portion 13 in the heat exchanger. The second part fluid path 123 includes a third sub-path 1231 and a fourth sub-path 1232, and the third sub-path 1231 and the fourth sub-path 1232 are located on two sides of the third blocking portion 14.

The first flow passage includes a first partial flow path 121, a second part fluid path 123, a third part fluid path 1224, and an inter-plate path 122, the first part fluid path 121 is formed at the first orifices of the first-type plates and the second-type plates, the second part fluid path 123 is formed at the second orifices of the first-type plates and the second-type plates, the third orifices of the first plates of the first-type plates are aligned with the third orifices of the second plates of the first-type plates to form the third part fluid path 1224, and the first part fluid path 121, the second part fluid path 123 and the third part fluid path 1224 are in communication through the inter-plate path 122. At least part of the valve core member 22 protrudes in the third part fluid path 1224, and at least part of the sensor 23 protrudes in the second part fluid path 123. The valve core member 22 includes a protruding-in portion 213, the protruding-in portion 213 protrudes in the third part fluid path 1224, at least part of the valve core member 22 protrudes into the protruding-in portion 213, and the valve core member 22 is sealed to an inner wall of the protruding-in portion 213.

The inter-plate path 122 at least includes a first heat exchange zone 1221, a second heat exchange zone 1222, a third heat exchange zone 1223 and a fourth heat exchange zone 1229. The first sub-path 1211 is in communication with the first heat exchange zone 1221, the first heat exchange zone 1221 is in communication with the third sub-path 1231, the first sub-path 1211 is in communication with the second heat exchange zone 1222, the second heat exchange zone 1222 is in communication with the third sub-path 1231, the third sub-path 1231 is in communication with the third heat exchange zone 1223, the third heat exchange zone 1223 is in communication with the second sub-path 1212, the second sub-path 1212 is in communication with the fourth heat exchange zone 1229, and the fourth heat exchange zone 1229 is in communication with the fourth sub-path 1232. The flow directions of the fluids between the adjacent heat exchange zones are opposite. A height of the first heat exchange zone is less than a height of the second heat exchange zone, the height of the second heat exchange zone is less than a height of the third heat exchange zone, and the height of the third heat exchange zone is less than a height of the fourth heat exchange zone. At least part of the valve core member 22 is inserted into the third part fluid path, and the fourth sub-path 1232 is in communication with the second chamber 212.

The heat exchanging assembly includes a drainage duct 3, the drainage duct 3 is located in the second part fluid path 123, the second chamber 212 is in communication with an inner chamber of the drainage duct 3, the third blocking portion 14 includes a middle hole 141, the inner chamber 31 of the drainage duct 3 is in communication with the middle hole 141 of the third blocking portion 14, and an outer wall of the drainage duct 3 is welded and fixed to the third blocking portion 14, so as to separate the flow passages on two sides of the second blocking portion.

The drainage pope includes a protruding-out portion and a main body portion, an outer diameter of the protruding-out portion is greater than an outer diameter of the main body portion, the main body portion protrudes into the second orifices of the multiple second-type plates, the protruding-out portion is located at the second orifices of the first-type plates, and the protruding-out portion is welded and fixed to the first-type plate or the second-type plate.

The heat exchanging assembly includes a first port and a second port, the first port can be configured as an inlet of the fluid, and the second port can be configured as an outlet of the fluid. After entering through the first port, the fluid passes through the throttle inlet passage, the throttle port and the throttle outlet passage of the valve core member, and enters the third part fluid path 1224, the first heat exchange zone 1221, the first part fluid path 1211, the second heat exchange zone 1222, the third sub-path 1231, the third heat exchange zone 1223, the second sub-path 1212, the fourth heat exchange zone 1229, the fourth sub-path 1232, the inner chamber 31 of the drainage duct 3 and the second chamber, and flows to the second through hole through the second groove, and finally flows away through the second port of the second through hole. When the heat exchanging assembly is configured as an evaporator, the fluid evaporates and absorbs heat inside the heat exchanger after the throttling and depression of the valve core member, and a temperature and/or pressure of the fluid is obtained by the sensor 23 when the fluid passes through the second chamber 212, and the temperature and/or pressure is fed back to the circuit board of the valve core member, so as to timely adjust the valve core member. In this way, the valve core member can be adjusted accurately and quickly, which facilitates of adjusting the superheat of the fluid at the outlet of the heat exchanging assembly, and is more beneficial for the stability of the performance of the system connected to the heat exchanging assembly. In addition, by providing the first blocking portion and the third blocking portion inside the heat exchanger core body, the multi-flow design inside the heat exchanger core body can be realized, which is beneficial for the fluid to exchange heat more uniformly inside the heat exchanger core body, and is more beneficial to improving the heat exchange efficiency.

It should be noted that, the description of the above embodiments is only used to illustrate the present application and is not intended to limit the technical solutions of the present application, such as the definitions of "front", "rear", "left", "right", "up", and "down". Although the present application is described in detail with reference to the above embodiments, it should be understood by those skilled in the art that, various combinations, modifications and equivalent substitutions can be made to the technical solutions of the present application, and all the technical solutions and improvements without departing from the spirit and scope of the present application fall within the scope of the appended claims of the present application.

The invention claimed is:

1. A heat exchanging assembly, comprising a heat exchanger core body, wherein the heat exchanger core body comprises at least a first flow passage, and the heat exchanger core body comprises a plurality of stacked first-type plates and a plurality of stacked second-type plates;
   each of the plurality of first-type plates comprises a first orifice, a second orifice and a third orifice, and the third orifice of each of the plurality of first-type plates is located between the first orifice and the second orifice of each of the plurality of first-type plates in a length or width direction of the heat exchanger core body;
   each of the plurality of second-type plates comprises a first orifice and a second orifice, and no orifice is provided between the first orifice and the second orifice of each of the plurality of second-type plates in the length or width direction of the heat exchanger core body;
   the first flow passage comprises a first part fluid path, a second part fluid path, a third part fluid path and an inter-plate path, the first part fluid path is formed by aligning the first orifice of each of the plurality of first-type plates and the first orifice of each of the plurality of second-type plates in a stacking direction of the plurality of first-type plates and the plurality of second-type plates;
   the second part fluid path is formed by aligning the second orifice of each of the plurality of first-type plates and the second orifice of each of the plurality of second-type plates in the stacking direction of the plurality of first-type plates and the plurality of second-type plates;
   the third part fluid path is formed by aligning the third orifice of each of the plurality of first-type plates in the stacking direction of the plurality of first-type plates and the plurality of second-type plates and the first part fluid path, the second part fluid path and the third part fluid path are in communication through the inter-plate path.

2. The heat exchanging assembly according to claim 1, wherein the heat exchanging assembly further comprises a valve assembly, the heat exchanger core body is fixedly arranged with the valve assembly, the valve assembly comprises a valve body, a valve core member and a sensor, the valve body comprises a first chamber and a second chamber, at least part of the valve core member is located in the first chamber, and at least part of the sensor is located in the second chamber;
   the first chamber is in communication with the first part fluid path, the second chamber is in communication with the second part fluid path, at least part of the valve core member is inserted into the first part fluid path, and the sensor senses a temperature and/or pressure of the third part fluid path; or the first chamber is in communication with the third part fluid path, the second chamber is in communication with the second part fluid path, at least part of the valve core member is inserted into the third part fluid path, and the sensor senses a temperature and/or pressure of the second part fluid path.

3. The heat exchanging assembly according to claim 2, wherein the heat exchanging assembly comprises a protruding-in portion, the protruding-in portion is located in the first part fluid path or the third part fluid path, at least part of the valve core member is located in the protruding-in portion, and the part of the valve core member is sealed to an inner wall of the protruding-in portion.

4. The heat exchanging assembly according to claim 3, wherein the second chamber is in communication with the third part fluid path; the sensor protrudes in the heat exchanger core body; the protruding-in portion is a part of the valve body, the valve body comprises a first side portion and a second side portion, the first side portion is matched with the valve core member, the second side portion is matched with the heat exchanger core body, and the second side portion is welded and fixed to the heat exchanger core body;
   the second side portion is provided with the protruding-in portion, which protrudes from the second side portion, the first chamber extends through the protruding-in portion, the first chamber extends through the first side portion and the second side portion, and the second chamber extends through the first side portion and the second side portion;
   the valve body comprises a first through hole, the second side portion comprises a first groove, and the first through hole is in communication with the first chamber through the first groove; when the second side portion is welded and fixed to the heat exchanger core body, the first groove is matched with the heat exchanger core body to form a flow passage; the valve body comprises a second through hole, the second side portion comprises a second groove, and the second through hole is in communication with the second chamber through the second groove;

when the second side portion is welded and fixed to the heat exchanger core body, the second groove is matched with the heat exchanger core body to form a flow passage;

the heat exchanging assembly comprises a first port and a second port, the first port and the second port are provided on the valve body, the first port is in communication with the first through hole, and the second port is in communication with the second through hole.

5. The heat exchanging assembly according to claim 3, wherein the protruding-in portion is a part of the valve body, the valve body comprises a first side portion and a second side portion, the first side portion is arranged to be matched with the valve core member, the second side portion is arranged to be matched with the heat exchanger core body, and the second side portion is welded and fixed to the heat exchanger core body; the second side portion is provided with the protruding-in portion, which is protruding from the second side portion, the first chamber extends through the protruding-in portion, the first chamber extends through the first side portion and the second side portion, and the second chamber extends through the first side portion and the second side portion;

the valve body comprises a first through hole, the second side portion comprises a first groove, and the first through hole is in communication with the first chamber through the first groove; when the second side portion is welded and fixed to the heat exchanger core body, the first groove is matched with the heat exchanger core body to form a flow passage;

the protruding-in portion comprises an opening portion and a root portion, the root portion comprises a notch, the notch is in communication with the first groove, the valve core member comprises a valve seat, a throttle inlet is provided on the valve seat, the throttle inlet is provided in a peripheral wall of the valve seat, and a flow area of the notch is greater than a flow area of the throttle inlet.

6. The heat exchanging assembly according to claim 5, wherein at least part of the valve core member protrudes in the first part fluid path, the heat exchanging assembly comprises a drainage duct, the drainage duct is located in the first part fluid path, the valve assembly comprises a throttle outlet passage, an inner chamber of the drainage duct is in communication with the throttle outlet passage, the first part fluid path comprises a first sub-path and a second sub-path, the first sub-path is in communication with the inner chamber of the drainage duct, and the second sub-path is located outside the drainage duct;

the heat exchanger core body comprises a first blocking portion, the first blocking portion is located in the second part fluid path, the second part fluid path comprises a third sub-path and a fourth sub-path, the third sub-path and the fourth sub-path are located on two sides of the first blocking portion;

the inter-plate path comprises at least a first heat exchange zone, a second heat exchange zone and a third heat exchange zone, the first sub-path is in communication with the first heat exchange zone, the first heat exchange zone is in communication with the third sub-path, the third sub-path is in communication with the second heat exchange zone, the second heat exchange zone is in communication with the second sub-path, and the second sub-path is in communication with the third heat exchange zone.

7. The heat exchanging assembly according to claim 5, wherein the protruding-in portion is located in the third part fluid path, the sensor protrudes in the heat exchanger core body, the second chamber is in communication with the second part fluid path, and the first chamber is in communication with the third part fluid path.

8. The heat exchanging assembly according to claim 3, wherein the protruding-in portion is located in the third part fluid path, the sensor protrudes in the heat exchanger core body, the second chamber is in communication with the second part fluid path, and the first chamber is in communication with the third part fluid path.

9. The heat exchanging assembly according to claim 8, wherein the inter-plate path comprises at least a first heat exchange zone and a second heat exchange zone, the first heat exchange zone is in communication with the first part fluid path, the second part fluid path is in communication with the second heat exchange zone, the heat exchanging assembly comprises a first port and a second port, the first port and the second port are located on the valve body, the first port is in communication with the first chamber, a throttle inlet passage, a throttle port and a throttle outlet passage of the valve core member, the throttle outlet passage is in communication with the third part fluid path, the first heat exchange zone, the first part fluid path, the second heat exchange zone, the second part fluid path, the second chamber and the second port.

10. The heat exchanging assembly according to claim 8, wherein the heat exchanging assembly comprises a drainage duct, the drainage duct is located in the second part fluid path, and the second chamber is in communication with an inner chamber of the drainage duct;

the heat exchanging assembly comprises a third blocking portion, the third blocking portion comprises a middle hole, the inner chamber of the drainage duct is in communication with the middle hole of the third blocking portion, and an outer wall of the drainage duct is welded and fixed to the third blocking portion.

11. The heat exchanging assembly according to claim 3, wherein at least part of the valve core member protrudes in the first part fluid path, the heat exchanging assembly comprises a drainage duct, the drainage duct is located in the first part fluid path, the valve assembly comprises a throttle outlet passage, an inner chamber of the drainage duct is in communication with the throttle outlet passage, the first part fluid path comprises a first sub-path and a second sub-path, the first sub-path is in communication with the inner chamber of the drainage duct, and the second sub-path is located outside the drainage duct;

the heat exchanger core body comprises a first blocking portion, the first blocking portion is located in the second part fluid path, the second part fluid path comprises a third sub-path and a fourth sub-path, the third sub-path and the fourth sub-path are located on two sides of the first blocking portion;

the inter-plate path comprises at least a first heat exchange zone, a second heat exchange zone and a third heat exchange zone, the first sub-path is in communication with the first heat exchange zone, the first heat exchange zone is in communication with the third sub-path, the third sub-path is in communication with the second heat exchange zone, the second heat exchange zone is in communication with the second sub-path, and the second sub-path is in communication with the third heat exchange zone.

12. The heat exchanging assembly according to claim 11, wherein the sensor protrudes in the heat exchanger core body; the third heat exchange zone comprises the third part fluid path, and the third part fluid path is in communication with the second chamber;

in a stacking direction of the plates, an extending depth of the third part fluid path in the heat exchanger core body is greater than a depth of the protruding-in portion protruding in the heat exchanger core body.

13. The heat exchanging assembly according to claim 12, wherein the valve assembly comprises a circuit board, the circuit board is electrically connected to the sensor, the valve assembly comprises a valve needle, and the circuit board controls the valve needle to move; the valve assembly is arranged coaxially with the first part fluid path, and the sensor is arranged parallel to the valve assembly.

14. The heat exchanging assembly according to claim 12, wherein the heat exchanger core body comprises a second blocking portion, the second blocking portion is located outside the drainage duct, the second sub-path comprises a first branch path and a second branch path, and the first branch path and the second branch path are located on two sides of the second blocking portion; the first branch path is in communication with the second heat exchange zone;

the third heat exchange zone comprises a first partition zone and a second partition zone, the first partition zone is in communication with the first branch path, the first partition zone is in communication with the fourth sub-path, the fourth sub-path is in communication with the second partition zone, and the second partition zone is in communication with the second branch path.

15. The heat exchanging assembly according to claim 12, wherein a height of the protruding-in portion protruding in the heat exchanger core body is greater than a height of the third part fluid path extending inside the heat exchange core body in a stacking direction of the plates;

the drainage duct comprises a protruding-out portion and a main body portion, an outer diameter of the protruding-out portion is greater than an outer diameter of the main body portion, the protruding-out portion comprises an end portion, and the end portion is welded and fixed to the protruding-out portion.

16. The heat exchanging assembly according to claim 11, wherein the heat exchanger core body comprises a second blocking portion, the second blocking portion is located outside the drainage duct, the second sub-path comprises a first branch path and a second branch path, and the first branch path and the second branch path are located on two sides of the second blocking portion; the first branch path is in communication with the second heat exchange zone;

the third heat exchange zone comprises a first partition zone and a second partition zone, the first partition zone is in communication with the first branch path, the first partition zone is in communication with the fourth sub-path, the fourth sub-path is in communication with the second partition zone, and the second partition zone is in communication with the second branch path.

17. The heat exchanging assembly according to claim 16, wherein a height of the first heat exchange zone is less than a height of the second heat exchange zone in a stacking direction of the plates, the height of the second heat exchange zone is less than a height of the first partition zone in the stacking direction of the plates, and the height of the first partition zone is less than a height of the second partition zone in a stacking direction of the plates;

the drainage duct comprises a protruding-out portion and a main body portion, an outer diameter of the protruding-out portion is greater than an outer diameter of the main body portion, the outer diameter of the main body portion is not greater than an outer diameter of the first orifices of the second-type plates, the main body portion protrudes in the first orifices of the second-type plates, and the outer diameter of the protruding-out portion is greater than the outer diameter of the first orifices of the second-type plates.

18. The heat exchanging assembly according to claim 16, wherein the valve assembly comprises a circuit board, the circuit board is electrically connected to the sensor, the valve assembly comprises a valve needle, and the circuit board controls the valve needle to move; the valve assembly is arranged coaxially with the first part fluid path, and the sensor is arranged parallel to the valve assembly.

19. The heat exchanging assembly according to claim 11, wherein a height of the protruding-in portion protruding in the heat exchanger core body is greater than a height of the third part fluid path extending inside the heat exchange core body in a stacking direction of the plates;

the drainage duct comprises a protruding-out portion and a main body portion, an outer diameter of the protruding-out portion is greater than an outer diameter of the main body portion, the protruding-out portion comprises an end portion, and the end portion is welded and fixed to the protruding-out portion.

20. The heat exchanging assembly according to claim 19, wherein the second sub-path comprises a first branch path and a second branch path, and the first branch path and the second branch path are located on two sides of the end portion; the first branch path is in communication with the second heat exchange zone; the third heat exchange zone comprises a first partition zone and a second partition zone, the first partition zone is in communication with the first branch path, the first partition zone is in communication with the fourth sub-path, the fourth sub-path is in communication with the second partition zone, and the second partition zone is in communication with the second branch path.

* * * * *